(12) United States Patent
Kim et al.

(10) Patent No.: US 9,971,222 B2
(45) Date of Patent: *May 15, 2018

(54) LIGHT CONTROLLING APPARATUS AND TRANSPARENT DISPLAY INCLUDING THE SAME

(71) Applicant: LG Display Co., Ltd., Seoul (KR)

(72) Inventors: Ki Han Kim, Gyeonggi-do (KR); Ji Young Ahn, Gyeonggi-do (KR); Moon Sun Lee, Chungcheongbuk-do (KR); Pu Reum Kim, Incheon (KR); Seok Won Ji, Incheon (KR)

(73) Assignee: LG Display Co., Ltd., Seoul (KR)

( * ) Notice: Subject to any disclaimer, the term of this patent is extended or adjusted under 35 U.S.C. 154(b) by 313 days.

This patent is subject to a terminal disclaimer.

(21) Appl. No.: 14/808,157

(22) Filed: Jul. 24, 2015

(65) Prior Publication Data

US 2016/0026026 A1    Jan. 28, 2016

(30) Foreign Application Priority Data

Jul. 25, 2014  (KR) .................. 10-2014-0094885
Jun. 12, 2015  (KR) .................. 10-2015-0083150

(51) Int. Cl.
| G02F 1/1337 | (2006.01) |
| G02F 1/137 | (2006.01) |
| G02F 1/1347 | (2006.01) |
| G02F 1/1343 | (2006.01) |
| G02F 1/1339 | (2006.01) |
| G02F 1/1334 | (2006.01) |
| G02F 1/1333 | (2006.01) |

(52) U.S. Cl.
CPC ........ *G02F 1/13737* (2013.01); *G02F 1/1334* (2013.01); *G02F 1/1337* (2013.01);
(Continued)

(58) Field of Classification Search
CPC .................. G02F 1/13725; G02F 2001/134381
See application file for complete search history.

(56) References Cited

U.S. PATENT DOCUMENTS

2008/0316395 A1   12/2008  O'Keeffe
2009/0244413 A1   10/2009  Ishikawa et al.
(Continued)

FOREIGN PATENT DOCUMENTS

CN       102782572 A     11/2012
JP       2013171209 A     9/2013
(Continued)

OTHER PUBLICATIONS

The First Office Action dated Dec. 28, 2017 from The State Intellectual Property Office of the People's Republic of China in related Chinese application No. 201510440968.0.

*Primary Examiner* — Phu Vu

(74) *Attorney, Agent, or Firm* — Morgan, Lewis & Bockius LLP

(57) ABSTRACT

A light controlling apparatus includes a first electrode on a first substrate; a first alignment film on the first electrode; a second electrode on a second substrate facing the first substrate; a second alignment film on the second electrode; and a guest-host liquid crystal layer having cholesteric liquid crystals and dichroic dyes between the first and second alignment films. The first and second electrodes provide a vertical electric field, and at least one of the first and second electrodes provides a horizontal electric field. The cholesteric liquid crystals have a homeotropic state when an electric field in a first direction is applied to the guest-host liquid crystal layer to realize a transparent mode. The cholesteric liquid crystals have a focal conic state when an electric field in a second direction is applied to realize a light shielding mode. A same state is maintained when no electric field is applied.

24 Claims, 17 Drawing Sheets

(52) U.S. Cl.
CPC ...... *G02F 1/13394* (2013.01); *G02F 1/13475* (2013.01); *G02F 1/13718* (2013.01); *G02F 1/13725* (2013.01); *G02F 1/134363* (2013.01); *G02F 1/133377* (2013.01); *G02F 2001/13345* (2013.01); *G02F 2001/133742* (2013.01); *G02F 2001/134372* (2013.01); *G02F 2001/134381* (2013.01); *G02F 2201/44* (2013.01); *G02F 2203/01* (2013.01)

(56) References Cited

U.S. PATENT DOCUMENTS

| | | |
|---|---|---|
| 2009/0290078 A1 | 11/2009 | Vang et al. |
| 2011/0122358 A1 | 5/2011 | Kim et al. |
| 2012/0140133 A1 | 6/2012 | Choi et al. |
| 2012/0268438 A1 | 10/2012 | Lee |
| 2012/0320298 A1* | 12/2012 | Suzuki .............. G02F 1/133553 349/43 |
| 2013/0044276 A1 | 2/2013 | Lee et al. |
| 2014/0211131 A1 | 7/2014 | Choi et al. |
| 2015/0378205 A1* | 12/2015 | Kim ....................... C09K 19/02 349/33 |

FOREIGN PATENT DOCUMENTS

| | | |
|---|---|---|
| KR | 10-2009-0072505 A | 7/2009 |
| KR | 10-2012-0120554 A | 11/2012 |
| KR | 10-2013-0039211 A | 4/2013 |
| KR | 101408690 B1 | 6/2014 |

* cited by examiner

LIGHT CONTROLLING APPARATUS AND TRANSPARENT DISPLAY INCLUDING THE SAME

CROSS REFERENCE TO RELATED APPLICATIONS

This application claims the benefit of the Korean Patent Application No. 10-2014-0094885 filed on Jul. 25, 2014, and No. 10-2015-0083150 filed on Jun. 12, 2015, which are hereby incorporated by reference for all purposes as if fully set forth herein.

BACKGROUND OF THE INVENTION

Field of the Invention

The present invention relates to a light controlling apparatus and a transparent display device, and more particularly, to a light controlling apparatus and a transparent display device having a transparent mode and a light-shielding mode.

Discussion of the Related Art

Recently, with the advancement of the information age, display devices for processing and displaying a large amount of information have been developed. More particularly, various display devices have been introduced and spotlighted. Examples of devices include liquid crystal display (LCD) devices, plasma display panel (PDP) devices, field emission display (FED) devices, electroluminescence display (ELD) devices, and organic electroluminescent display (OLED) devices. The display devices generally have properties of a thin profile, light weight and low power consumption. Thus, their fields of application fields have continuously increased. In particular, in most electronic devices or mobile devices, a display device has been used as a user interface.

Also, transparent display devices, through which a user may see objects or images located at an opposite side, have been developed. The transparent display devices may have advantages of better use of space, interior and design, and may be applied in various application fields. The transparent display devices may solve spatial and temporal restrictions of the existing electronic devices by realizing functions of information recognition, information processing, and information display as a transparent electronic device. Such transparent display devices may be used for a smart window, which may be used as a window of a smart home or a smart car.

Of the transparent display devices, the transparent display device based on LCD may be realized by applying an edge type backlight thereto. However, the transparent display device to which LCD technologies are applied has a problem in that transparency is deteriorated by a polarizing plate used for realization of black. Also, a problem occurs in outdoor visibility of the transparent display device based on LCD.

The transparent display device based on OLED has power consumption higher than that of the LCD and has a difficulty in displaying a true black. Also, although the transparent display device based on OLED has no problem regarding contrast ratio in a dark environment, a problem occurs in that a contrast ratio is deteriorated under a normal lighting environment.

To solve the above problems, a method for applying a light controlling apparatus to a transparent display device has been suggested, wherein the light controlling apparatus may realize a transparent mode that transmits light incident upon a rear surface of the transparent display device and a light-shielding mode shielding the light. A reflective liquid crystal display device and a method for controlling the same are disclosed in Korean Patent Application No. 10-2011-0103726.

SUMMARY OF THE INVENTION

Accordingly, the present invention is directed to a light controlling apparatus and a transparent display device including the same, which substantially obviate one or more problems due to limitations and disadvantages of the related art.

An object of the present invention is to provide a light controlling apparatus and a transparent display device including the same, which may transmit or shield light by using a focal conic state and a homeotropic state of a guest-host liquid crystal layer.

Another object of the present invention is to provide a light controlling apparatus that may realize a transparent mode at an initial state in which no voltage is applied by using an alignment material included in a liquid crystal layer or an alignment film.

Still another object of the present invention is to provide a light controlling apparatus that may increase a light transmittance ratio in a transparent mode and increase a light shielding ratio in a light shielding mode by using a focal conic state and a homeotropic state of cholesteric liquid crystals in a guest-host liquid crystal layer.

Still another object of the present invention is to provide a light controlling apparatus that may be realized by two stable states for stably maintaining a homeotropic state and a focal conic state due to an alignment film even though no voltage is applied after a state change.

Still another object of the present invention is to provide a light controlling apparatus based on a liquid crystal layer, which may reduce the cost by simplifying its manufacturing process.

Still another object of the present invention is to provide a light controlling apparatus based on cholesteric liquid crystals that do not reflect light of a visible ray wavelength range.

Still another object of the present invention is to provide a light controlling apparatus that may display a specific color in accordance with dichroic dyes to allow a rear background not to be seen.

Still another object of the present invention is to provide a light controlling apparatus that includes spacers for maintaining a cell gap of a guest-host liquid crystal layer to protect the inside of a cholesteric liquid crystal layer when an external force is applied thereto, and at the same time to allow the spacers to serve as barriers for partitioning the guest-host liquid crystal layer.

Still another object of the present invention is to provide a light controlling apparatus that includes refractive index matching layers to increase transmittance by reducing a refractive index difference.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a light controlling apparatus comprises a first electrode on a first substrate; a first alignment film on the first electrode; a second electrode on a second substrate facing the first substrate; a second alignment film on the second electrode; and a guest-host liquid crystal layer between the first alignment film and the second alignment film, the guest-host liquid crystal layer including cholesteric liquid crystals and dichroic dyes, wherein the first and second electrodes provide a vertical electric field, at least one of the first and second electrodes provides a horizontal electric field, the cholesteric liquid crystals have a homeotropic state when an electric field in a first direction is applied to the guest-host liquid crystal layer, whereby a transparent mode transmitting incident light is realized, the cholesteric liquid crystals have a focal conic state when an electric field in a second direction is applied to the guest-host liquid crystal layer, whereby a light shielding mode shielding incident light is realized, and the cholesteric liquid crystals and the dichroic dyes maintain the same state when no electric field is applied to the guest-host liquid crystal layer.

In another aspect, a light controlling apparatus comprises a first electrode on a first substrate; a second electrode on a second substrate facing the first substrate; and a guest-host liquid crystal layer between the first electrode and the second electrode, the guest-host liquid crystal layer including cholesteric liquid crystals, dichroic dyes and a vertical alignment material arranging the cholesteric liquid crystals and the dichroic dyes in a vertical direction, wherein the first and second electrodes provide a vertical electric field, at least one of the first and second electrodes provides a horizontal electric field, the cholesteric liquid crystals have a homeotropic state when an electric field in a first direction is applied to the guest-host liquid crystal layer, whereby a transparent mode transmitting incident light is realized, the cholesteric liquid crystals have a focal conic state when an electric field in a second direction is applied to the guest-host liquid crystal layer, whereby a light shielding mode shielding incident light is realized, and the cholesteric liquid crystals maintain the same state when no electric field is applied to the guest-host liquid crystal layer.

In another aspect, a transparent display device comprises a transparent display panel including a transmissive area and an emissive area, the emissive displaying an image; and a light controlling apparatus on at least one surface of the transparent display panel, wherein the light controlling apparatus includes a guest-host liquid crystal layer between a first alignment film and a second alignment film, the guest-host liquid crystal layer including cholesteric liquid crystals and dichroic dyes, and the cholesteric liquid crystals have a focal conic state in a display mode for displaying the image in the emissive area, whereby the light controlling apparatus is realized in a light shielding mode shielding incident light.

In another aspect, a light controlling apparatus comprises a first electrode on a first substrate; a first alignment film on the first electrode; a second electrode on a second substrate facing the first substrate; a second alignment film on the second electrode; a third electrode between the first substrate and the first electrode; a guest-host liquid crystal layer between the first alignment film and the second alignment film, including cholesteric liquid crystals and dichroic dyes, wherein the first and second electrodes provide a vertical electric field, the first and third electrodes provide a horizontal electric field, the cholesteric liquid crystals have a homeotropic state when an electric field in a first direction is applied to the guest-host liquid crystal layer, whereby a transparent mode transmitting incident light is realized, the cholesteric liquid crystals have a focal conic state when an electric field in a second direction is applied to the guest-host liquid crystal layer, whereby a light shielding mode shielding incident light is realized, and the cholesteric liquid crystals maintain the same state when no electric field is applied to the guest-host liquid crystal layer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE ILLUSTRATED EMBODIMENTS

Figure 1:
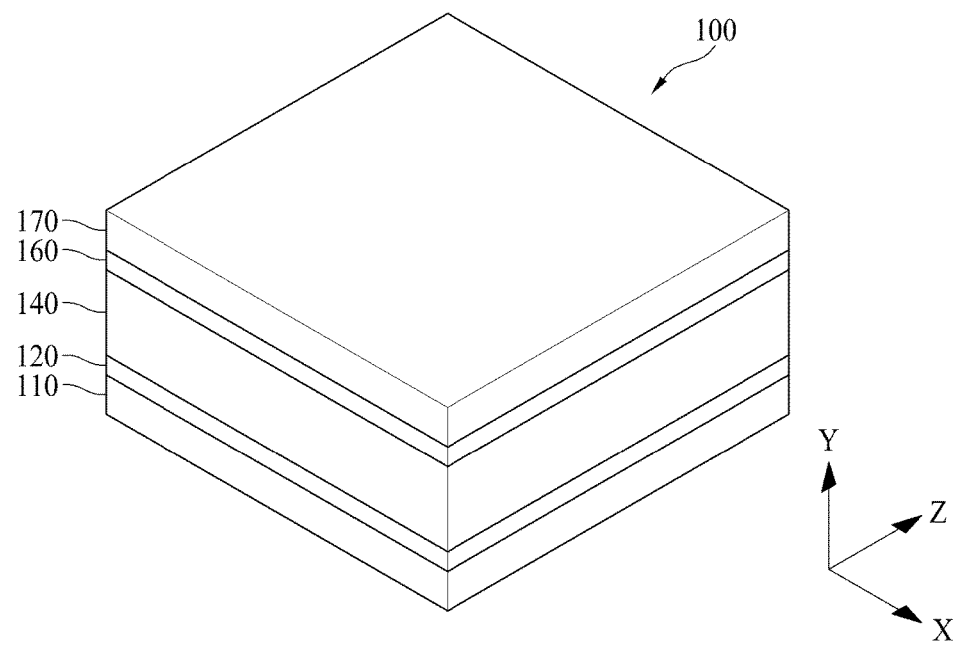
FIG. 1 is a perspective view illustrating a light controlling apparatus according to one embodiment of the present invention.

Reference will now be made in detail to the exemplary embodiments of the present invention, examples of which are illustrated in the accompanying drawings. Wherever possible, the same reference numbers will be used throughout the drawings to refer to the same or like parts.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims.

A shape, a size, a ratio, an angle, and a number disclosed in the drawings for describing embodiments of the present invention are merely an example, and thus, the present invention is not limited to the illustrated details. Like reference numerals refer to like elements throughout. In the following description, when the detailed description of the relevant known function or configuration is determined to unnecessarily obscure the important point of the present invention, the detailed description will be omitted.

In a case where "comprise," "have," and "include" described in the present specification are used, another part may be added unless "only" is used. The terms of a singular form may include plural forms unless referred to the contrary.

In construing an element, the element is construed as including an error range although there is no explicit description.

In description of embodiments of the present invention, when a structure (for example, an electrode, a line, a wiring, a layer, or a contact) is described as being formed at an upper portion/lower portion of another structure or on/under the other structure, this description should be construed as including a case where the structures contact each other and moreover, a case where a third structure is disposed therebetween.

In describing a time relationship, for example, when the temporal order is described as "after," "subsequent," "next," and "before," a case which is not continuous may be included unless "just" or "direct" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present invention.

"X-axis direction," "Y-axis direction," and "Z-axis direction" should not be construed by a geometric relation only of a mutual vertical relation, and may have broader directionality within the range that elements of the present invention may act functionally.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present invention may be partially or overall coupled to or combined with each other, and may be variously inter-operated with each other and driven technically as those skilled in the art can sufficiently understand. The embodiments of the present invention may be carried out independently from each other, or may be carried out together in co-dependent relationship.

Hereinafter, the illustrated embodiments of the present invention will be described in detail with reference to the accompanying drawings.

A guest-host liquid crystal layer has been studied as a liquid crystal layer for use as a light controlling apparatus of a transparent display device. In this case, guest means dichroic dyes added to liquid crystals, and host means the liquid crystals. In a guest-host mode, an arrangement direction of the liquid crystals is controlled by an electric field generated by an applied voltage, and the dichroic dyes are aligned simultaneously in the same direction as that of the liquid crystals. Therefore, incident lights are scattered and absorbed by the liquid crystals and the dichroic dyes, whereby a light shielding mode is realized. If a voltage is applied, the liquid crystals and the dichroic dyes are aligned in a direction perpendicular to a substrate, and all the incident lights pass through the guest-host liquid crystals, whereby a transparent (or transmissive) mode is realized.

At this time, the liquid crystals used for the host may be categorized into nematic liquid crystals, smectic liquid crystals and cholesteric liquid crystals.

Of the liquid crystals, the cholesteric liquid crystals may make a state transition or a phase transition to three states of a planar state, a focal conic state and a homeotropic state. The planar state may reflect light of a specific wavelength of incident lights, the focal conic state may scatter the incident lights, and the homeotropic state may transmit the incident lights. Because the cholesteric liquid crystals may reflect, scatter or transmit light through state transition, they have been widely used for a reflective display device.

The cholesteric liquid crystals may realize in a light shielding mode using scattering of the focal conic state and realize a transparent mode by using a state that a voltage is applied. However, the cholesteric liquid crystals represent a light shielding mode using light scattering only in the light shielding mode. Therefore, a light shielding mode of black—not a light shielding mode of white—should be realized for a light controlling apparatus for a transparent display device in view of improvement of visibility or a contrast ratio. Also, scattering characteristics should be improved when a scattering level of the focal conic state is weak.

Therefore, in accordance with embodiments of the present invention, a guest-host liquid crystal layer (GHLC) may realize a light shielding mode of a black. That is, the guest-host liquid crystal layer may realize a light shielding mode of a black through light absorption of the dyes corresponding to guest. However, if the guest-host liquid crystal layer does not include a polymer, it is difficult to realize scattering due to absence of the polymer, whereby light shielding ratio is reduced in a light shielding mode.

Therefore, if the amount of dyes in the guest-host liquid crystal layer is increased to increase light shielding ratio, a problem occurs in that transmittance ratio in the transparent mode is reduced.

Also, if the light controlling apparatus is applied to the transparent display device, the light controlling apparatus should be realized in a transparent mode, whereby a user may see a rear background of the transparent display device. Therefore, if the transparent display device is desired to be realized to allow a user to see a rear background of the transparent display device at an initial state that no voltage is applied, the inventors of the present invention have recognized that power consumption of the light controlling apparatus should be minimized in the transparent mode. In this respect, embodiments of the present invention recognizes the aforementioned problems and provides a light controlling apparatus of a new structure, which may increase transmittance ratio while minimizing light absorption of dyes in a transparent mode and realize a light shielding mode, which may include a blocking state or a translucent state, having high light shielding ratio in a light shielding mode.

[Light Controlling Apparatus]

A light controlling apparatus according to example embodiments of the present invention will be described in detail with reference to FIGS. 1 to 15.

Figure 2:
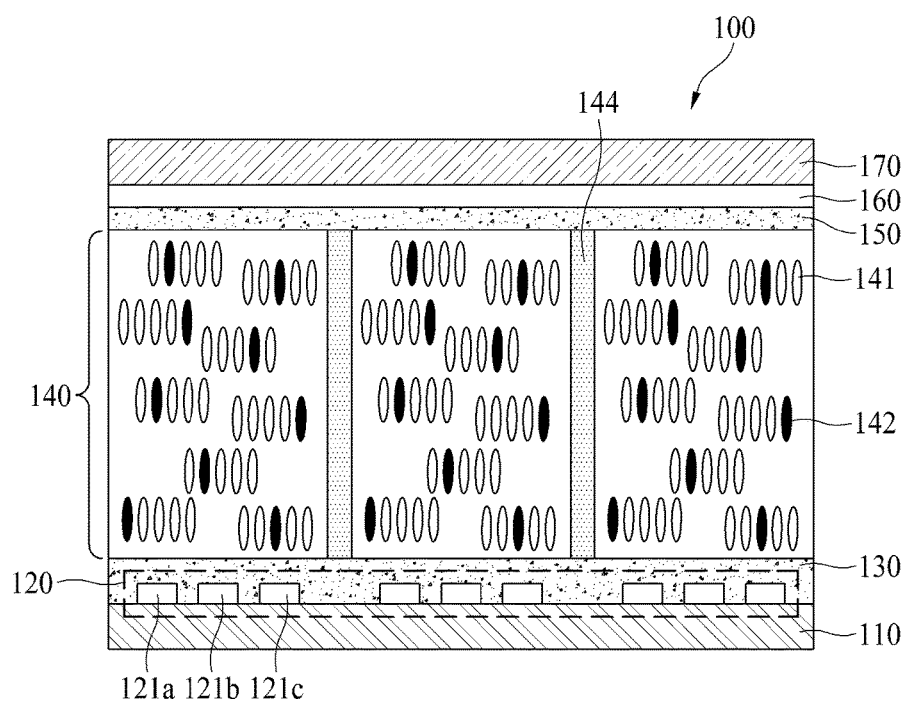
FIG. 2 is a cross-sectional view illustrating a detailed example of a light controlling apparatus of FIG. 1.

FIG. 1 is a perspective view illustrating a light controlling apparatus according to one embodiment of the present invention. FIG. 2 is a cross-sectional view illustrating a detailed example of a light controlling apparatus of FIG. 1. With reference to FIGS. 1 and 2, a light controlling apparatus 100 according to one embodiment of the present invention includes a first substrate 110, a first electrode 120, a first alignment film 130, a guest-host liquid crystal layer (GHLC) 140, a second alignment film 150, a second electrode 160, and a second substrate 170.

Each of the first substrate 110 and the second substrate 170 may be a transparent glass substrate or a plastic film. For example, each of the first substrate 110 and the second substrate 170 may be, but are not limited to, a sheet or film that includes cellulose resin such as TAC (triacetyl cellulose) or DAC (diacetyl cellulose), COP (cyclo olefin polymer) such as norbornene derivatives, COC (cyclo olefin copolymer), acryl resin such as PMMA (poly(methylmethacrylate)), polyolefin such as PC (polycarbonate), PE (polyethylene) or PP (polypropylene), polyester such as PVA (polyvinyl alcohol), PES (poly ether sulfone), PEEK (polyetheretherketone), PEI (polyetherimide), PEN (polyethylenenaphthalate), and PET (polyethyleneterephthalate), PI (polyimide), PSF (polysulfone), or fluoride resin.

The first electrode 120 is provided on the first substrate 110, and the second electrode 160 is provided on the second substrate 170. At least one among the first electrode 120 and the second electrode 160 may include split electrodes 121. In FIG. 2, the first electrode 120 is provided on one surface of the first substrate 110 as a plurality of split electrodes 121, and the second electrode 160 is provided on the entirety of one surface of the second substrate 170. However, the split electrodes may be electrodes patterned in a predetermined shape without limitation to the example of FIG. 2.

Each of the first and second electrodes 120 and 160 may be a transparent electrode. For example, each of the first and second electrodes 120 and 160 may be formed of a transparent conductive material that has conductivity and at the same time may transmit light. For example, each of the first and second electrodes 120 and 160 may be, but is not limited to, silver oxide (e.g., AgO or $Ag_2O$ or $Ag_2O_3$), aluminum oxide (e.g., $Al_2O_3$), tungsten oxide (e.g., $WO_2$ or $WO_3$ or $W_2O_3$), magnesium oxide (e.g., MgO), molybdenum oxide (e.g., $MoO_3$), zinc oxide (e.g., ZnO), tin oxide (e.g., $SnO_2$), indium oxide (e.g., $In_2O_3$), chrome oxide (e.g., $CrO_3$ or $Cr_2O_3$), antimony oxide (e.g., $Sb_2O_3$ or $Sb_2O_5$), titanium oxide (e.g., $TiO_2$), nickel oxide (e.g., NiO), copper oxide (e.g., CuO or $Cu_2O$), vanadium oxide (e.g., $V_2O_3$ or $V_2O_5$), cobalt oxide (e.g., CoO), iron oxide (e.g., $Fe_2O_3$ or $Fe_3O_4$), niobium oxide (e.g., $Nb_2O_5$), Indium Tin Oxide (ITO), Indium Zinc Oxide (IZO), Aluminum doped Zinc Oxide (ZAO), Aluminum Tin Oxide (TAO) or Antimony Tin Oxide (ATO).

As shown in FIG. 1, in the light controlling apparatus 100, the first electrode 120 is provided on the first substrate 110, and the first alignment film 130 is provided on the first electrode 120. Also, the second electrode 160 is provided on the second substrate 150, and the second alignment film 150 is provided on the second electrode 160. The liquid crystal layer 140 is included between the first alignment film 130 and the second alignment film 160.

As shown in FIG. 2, the first alignment film 130 is provided on the first electrode 120, and the second alignment film 150 is provided on the second electrode 160. Each of the first and second alignment films 130 and 150 may be formed of a vertical alignment material for aligning the cholesteric liquid crystals 141 and the dichroic dyes 142 in a vertical direction (y-axis direction). The cholesteric liquid crystals 141 and the dichroic dyes 142 of the guest-host liquid crystal layer 140 may be arranged in a vertical direction (y-axis direction) due to the first and second alignment films 130 and 150 even though the electric field is not applied. Each of the first and second alignment films 130 and 150 may be formed of at least one of polyimide and phosphatidylcholine (PPC). Alternatively, each of the first and second alignment films 130 and 150 may be formed by mixing HTAB (hexadecyltrimethylammonium bromide) or CTAB (cetyl trimethyl ammonium bromide) with a solvent, such as isopropyl alcohol (IPA), coating the mixture on the first electrode 120 and the second electrode 160 and evaporating the solvent. The material of each of the first and second alignment films 130 and 150 is not limited to the above example.

The guest-host liquid crystal layer 140 is provided between the first alignment film 130 and the second alignment film 150. The guest-host liquid crystal layer 140 may be a liquid crystal layer that includes the cholesteric liquid crystals 141 and the dichroic dyes 142. In this case, the guest of the guest-host liquid crystal layer 140 may be the dichroic dyes 142, and the host may be the cholesteric liquid crystals 141. Also, the guest-host liquid crystal layer 140 may further include a chiral dopant or photo-sensitive chiral dopant, which derives a helical structure, and a photoinitiator in the cholesteric liquid crystals 141 and the dichroic dyes 142. The cholesteric liquid crystals 141 may be referred to as chiral nematic liquid crystals.

The cholesteric liquid crystals 141 included in the guest-host liquid crystal layer 140 may be subjected to state transition to a planar state, a focal conic state, and a homeotropic state. The cholesteric liquid crystals 141 included in the guest-host liquid crystal layer 140 may be controlled at the homeotropic state in the transparent mode and controlled at the focal conic state in the light shielding mode.

The cholesteric liquid crystals 141 may be nematic liquid crystals. The cholesteric liquid crystals 141 may be positive type liquid crystals or negative type liquid crystals. The positive type liquid crystals may be arranged in a vertical direction (y-axis direction) by the vertical electric field, whereas the negative type liquid crystals may be arranged in a vertical direction (y-axis direction) by the horizontal electric field.

The dichroic dyes 142 may be the dyes that absorb light. For example, the dichroic dyes 142 may be black dyes that absorb every light of a visible ray wavelength range or dyes that absorb light except a specific colored (for example, red) wavelength and reflect light of the specific colored (for example, red) wavelength. The dichroic dyes 142 may be, but are not limited to, black dyes to increase light shielding efficiency like the example embodiment of the present invention.

Alternatively, the dichroic dyes 142 may be formed of dyes having a color, and may have any one color of a black, a red, a green, a blue, and a yellow, or their mixture color. For example, if the light controlling apparatus 100 is coupled to a rear surface of a transparent display panel, light from the rear surface should be shielded to improve visibility of an image while the image is being displayed. In this case, the dichroic dyes 142 may be made of black dyes. In addition, a color of the dichroic dyes 142 may be selectively changed depending on a place where the light controlling apparatus 100 is used and a purpose of use of the light controlling apparatus 100, whereby esthetic effect may be provided to a user.

Also, if the cholesteric liquid crystals 141 are positive type liquid crystals, the dichroic dyes 142 have properties of the positive type liquid crystals, and if the cholesteric liquid crystals 141 are negative type liquid crystals, the dichroic dyes 142 have properties of the negative type liquid crystals.

The dichroic dyes 142 may be, but not limited to, a material that includes Aluminum Zinc Oxide (AZO). The dichroic dyes 142 may be included in the guest-host liquid crystal layer 140 in the range of 0.5 wt % to 1.5 wt % when a cell gap of the guest-host liquid crystal layer 140 is 5 μm to 15 μm. However, the dichroic dyes 142 smaller than 0.5 wt % may be included in the guest-host liquid crystal layer 140 if a light shielding ratio of the dichroic dyes 142 is very high. In this case, the amount of the dichroic dyes 142 may include 0.1 wt %. Alternatively, the dichroic dyes 142 in the guest-host liquid crystal layer 140 may include more than 1.5 wt % to improve the light shielding ratio if the cell gap of the guest-host liquid crystal layer 140 is small. Therefore, if the cell gap is smaller than 5 μm, the dichroic dyes 142 in the guest-host liquid crystal layer 140 may adjust 3 wt %. Meanwhile, the dichroic dyes 142 have a predetermined refractive index but their amount in the guest-host liquid crystal layer 140 is small, and the dichroic dyes 142 absorb incident light. Therefore, the dichroic dyes 142 do not substantially refract the incident light.

Also, the light controlling apparatus may increase the amount of the dichroic dyes 142 in the guest-host liquid crystal layer 140 to increase the light shielding ratio in the light shielding mode. However, in this case, a transmittance ratio may be reduced. Therefore, the amount of the dichroic dyes 142 in the guest-host liquid crystal layer 140 may be adjusted considering the light shielding ratio of the light shielding mode and the transmittance ratio of the transparent mode.

Also, the dichroic dyes 142 may easily be discolored by ultraviolet rays (hereinafter, referred to as "UV"). In more detail, a polymer dispersed liquid crystal (PDLC) layer or polymer network liquid crystal (PNLC) layer, which includes the dichroic dyes 142, essentially needs a UV process for hardening a polymer. In this case, a problem may occur in that the dichroic dyes 142 may be discolored by UV. For example, blue dichroic dyes 142 may be discolored to a purple color by the UV. In this case, because the wavelength range of light absorbed by the dichroic dyes 142 is varied, a problem may occur in that light shielding is performed by a color different from an originally intended color. Also, the dichroic dyes 142 may be damaged by the UV, whereby a light absorption ratio of the dichroic dyes 142 may be reduced. As a result, because the light shielding ratio of the light shielding mode of the light controlling apparatus is reduced, the amount of the dichroic dyes 142 should be increased, whereby the cost may be increased. Therefore, the guest-host liquid crystal layer 140 that includes the dichroic dyes 142 may be formed without UV processing.

The cholesteric liquid crystals 141 may be arranged to be rotated helically by the chiral dopant at the planar state and the focal conic state. Also, the cholesteric liquid crystals 141 and the dichroic dyes 142 may be arranged along a vertical direction (y-axis direction) at the homeotropic state. That is, the cholesteric liquid crystals 141 and the dichroic dyes 142 may be arranged in such a manner that their long axes are arranged along the vertical direction (y-axis direction) at the homeotropic state. The dichroic dyes 142 included in the guest-host liquid crystal layer 140 may be moved in accordance with a state transition.

The spacers 144 maintain a cell gap of the guest-host liquid crystal layer 140. Also, if an external force is applied to the light controlling apparatus 100, the spacers 144 may protect the inside of the guest-host liquid crystal layer 140 and at the same time prevent the first electrode 120 and the second electrode 160 from being shorted. Also, the spacers 144 may serve as barriers that partition the guest-host liquid crystal layer 140. In this case, the same amount of the cholesteric liquid crystals 141 and dichroic dyes 142 may be included in each of the partitioned spaces, or the amount of the chiral dopant may be controlled for each of the partitioned spaces to vary the pitch P of the cholesteric liquid crystals 141 arranged in a helical structure by the chiral dopant. If the pitch P of the cholesteric liquid crystals 141 arranged in a helical structure by the chiral dopant is varied, the wavelength range of the light reflected by the cholesteric liquid crystals 141 arranged in a helical structure by the chiral dopant may be controlled as described later in detail with reference to FIG. 6. Each of the spacers 144 may be formed of, but are not limited to, at least one among a photo resist, polydimethylsiloxane, a polymer, and a UV curable polymer, which are transparent materials that may transmit light.

The light controlling apparatus 100 according to the example embodiment of the present invention may further include a voltage supply unit for supplying a predetermined voltage to each of the first and second electrodes 120 and 160. At this time, the light controlling apparatus 100 may be realized in a light shielding mode shielding incident light and a transparent mode transmitting incident light by controlling the voltages applied to the first and second electrodes 120 and 160 and state-transiting the cholesteric liquid crystals 141. Hereinafter, the transparent mode and the light shielding mode of the light controlling apparatus 100 in the case of the positive type liquid crystals will be described in detail with reference to FIGS. 3A, 3B, 4A and 4B, and the transparent mode and the light shielding mode of the light controlling apparatus 100 in the case of the negative type liquid crystals will be described in detail with reference to FIGS. 7A, 7B, 8A and 8B.

Figure 3A:
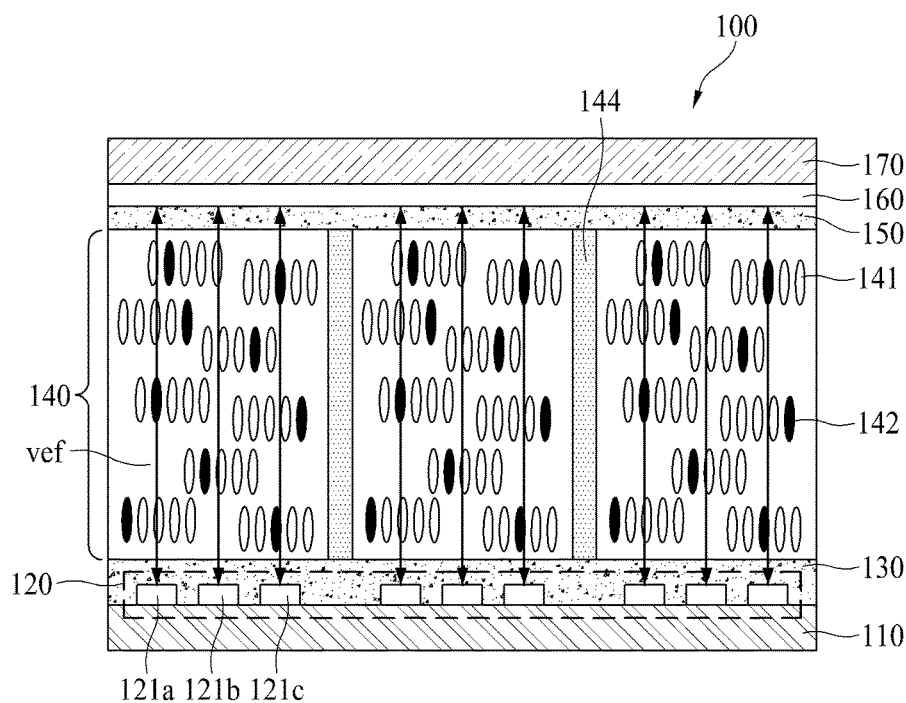
FIGS. 3A and 3B are cross-sectional views illustrating a light controlling apparatus of FIG. 2 in a transparent mode in a case of positive type liquid crystals.
Figure 3B:
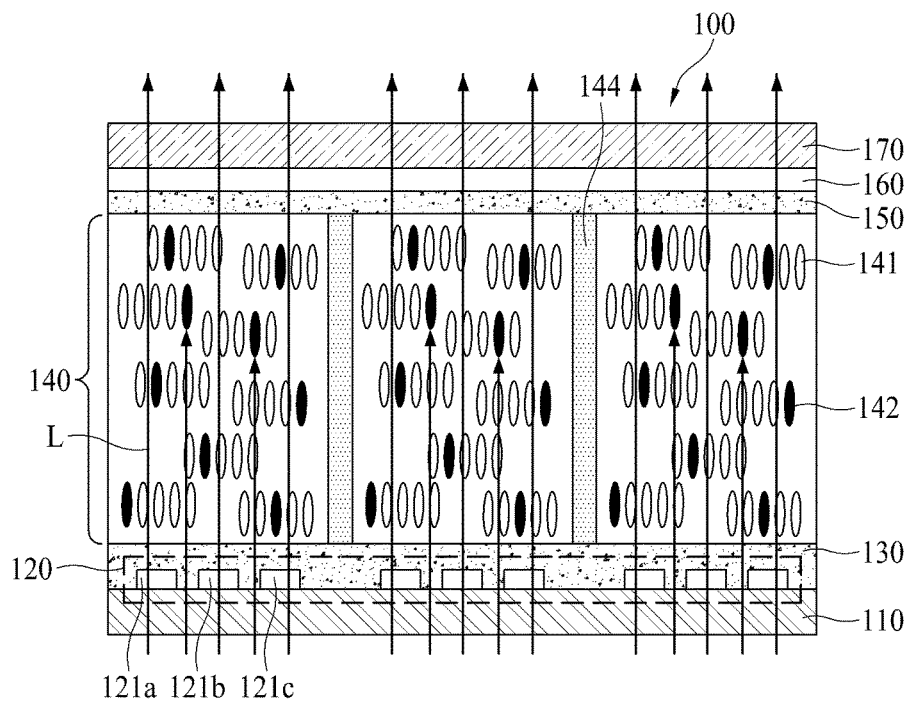

FIGS. 3A and 3B are cross-sectional views illustrating a light controlling apparatus of FIG. 2 in a transparent mode in the case of positive type liquid crystals. FIG. 3A is a cross-sectional view illustrating an electric field applied to realize a transparent mode in the case of positive type liquid crystals, and FIG. 3B is a cross-sectional view illustrating a light path in a transparent mode.

As shown in FIG. 3A, the cholesteric liquid crystals 141 and the dichroic dyes 142 of the guest-host liquid crystal layer 140 have the homeotropic state in the transparent mode. If the cholesteric liquid crystals 141 and the dichroic dyes 142 of the guest-host liquid crystal layer 140 have properties of the positive type liquid crystals, the vertical electric field vef should be applied to the guest-host liquid crystal layer 140 such that the guest-host liquid crystal layer 140 may be subjected to state transition from the focal conic state or the planar state to the homeotropic state. The vertical electric field vef may be the electric field formed between the first and second electrodes 120 and 160 arranged in a vertical direction (y-axis direction) if a difference between the voltage applied to the first electrode 120 and the voltage applied to the second electrode 160 is greater than a first reference voltage.

Meanwhile, in order that the vertical electric field vef is equally applied to the cholesteric liquid crystals 141 and the dichroic dyes 142 in the transparent mode, a distance between the split electrodes 121 of the first electrode 120 may be formed to be smaller than two times of a width of each split electrode 121. If the distance between the split electrodes 121 of the first electrode 120 is greater than two times of the width of each split electrode 121 or several tens of μm, a difference may occur between the vertical electric field vef applied to the cholesteric liquid crystals 141 and the dichroic dyes 142, which are arranged on the split electrodes 121, and the vertical electric field vef applied to the cholesteric liquid crystals 141 and the dichroic dyes 142, which are arranged between the split electrodes 121, whereby a problem may occur in that the vertical electric field vef may not be applied equally.

As shown in FIG. 3B, the cholesteric liquid crystals 141 and the dichroic dyes 142 are arranged in a vertical direction (y-axis direction) at the homeotropic state, and are not rotated helically. At this time, because the cholesteric liquid crystals 141 and the dichroic dyes 142 are arranged in an incident direction of light L, scattering and absorption of the light L incident upon the guest-host liquid crystal layer 140 are minimized. Therefore, most of the light L incident upon the light controlling apparatus 100 may pass through the guest-host liquid crystal layer 140.

Meanwhile, if a state transition from the focal conic state or the planar state to the homeotropic state is generated by the vertical electric field vef, the cholesteric liquid crystals 141 and the dichroic dyes 142 of the guest-host liquid crystal layer 140 may maintain the homeotropic state due to the first and second alignment films 130 and 150 even though the vertical electric field vef is not applied any more. That is, the cholesteric liquid crystals 141 and the dichroic dyes 142 of the guest-host liquid crystal layer 140 may stably maintain the homeotropic state due to the first and second alignment films 130 and 150 even though the vertical electric field vef is not applied any more. Therefore, in the example embodiment of the present invention, even though no voltage is applied after a state transition to the homeotropic state, the transparent mode may be realized at the initial state, whereby power consumption may be reduced.

Figure 4A:
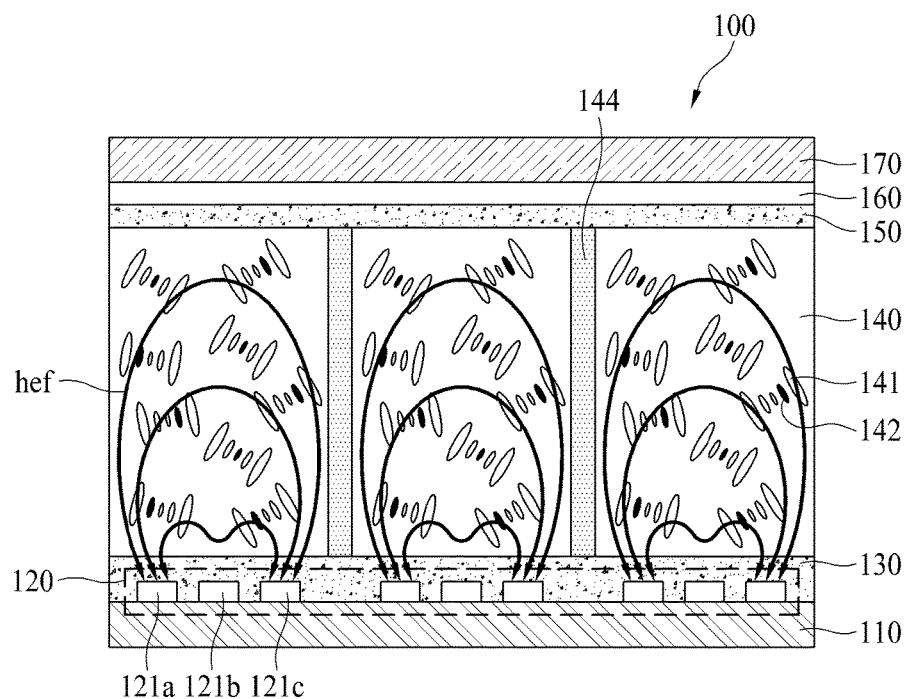
FIGS. 4A and 4B are cross-sectional views illustrating a light controlling apparatus of FIG. 2 in a light shielding mode in a case of positive type liquid crystals.
Figure 4B:
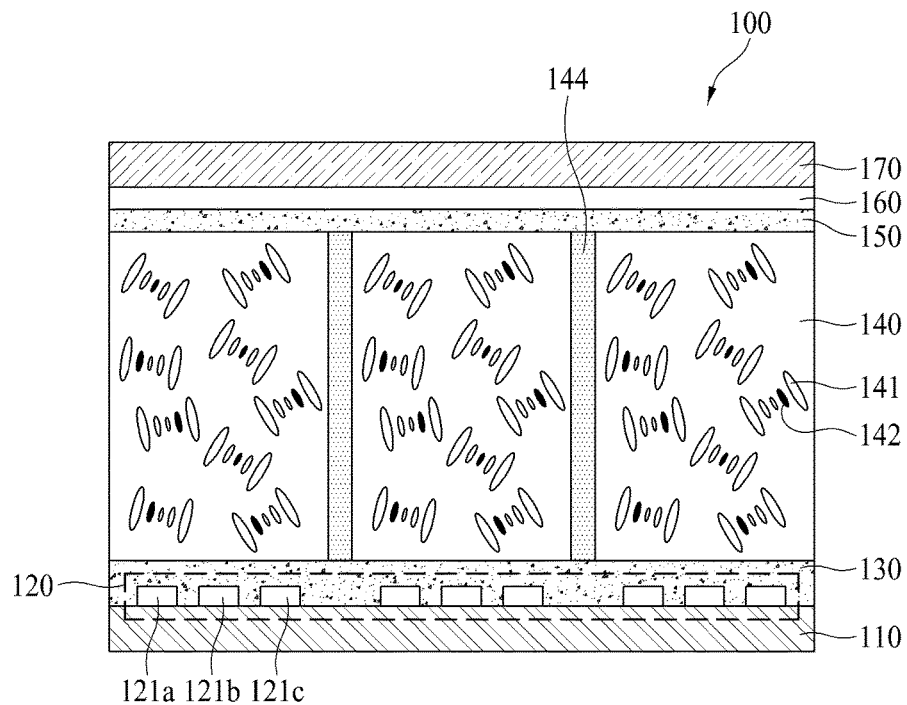

FIGS. 4A and 4B are cross-sectional views illustrating a light controlling apparatus of FIG. 2 in a light shielding mode in the case of positive type liquid crystals. FIG. 4A is a cross-sectional view illustrating an electric field applied to realize a light shielding mode in the case of positive type liquid crystals, and FIG. 4B is a cross-sectional view illustrating a light path in a light shielding mode.

As shown in FIG. 4A, the cholesteric liquid crystals 141 and the dichroic dyes 142 of the guest-host liquid crystal layer 140 are controlled at the focal conic state in the light shielding mode. If the cholesteric liquid crystals 141 and the dichroic dyes 142 of the guest-host liquid crystal layer 140 have properties of the positive type liquid crystals, the horizontal electric field hef should be applied to the guest-host liquid crystal layer 140 such that the guest-host liquid crystal layer 140 may be subjected to state transition from the homeotropic state to the focal conic state. The horizontal electric field hef may be the electric field between the split electrodes 121 arranged in a horizontal direction (x-axis direction or z-axis direction) if a difference between the voltages applied to the split electrodes 120 of the first electrode 120 is greater than a second reference voltage.

Meanwhile, in order that the vertical electric field vef is equally applied to the cholesteric liquid crystals 141 and the dichroic dyes 142 in the transparent mode, the distance between the split electrodes 121 of the first electrode 120 may be smaller than two times of the width of each split electrode 121. At this time, a problem may occur in that the horizontal electric field hef may not be applied in the light shielding mode due to a short distance between the split electrodes 121 which are adjacent to each other. Therefore, it may be preferable for the light shielding mode that no voltage is applied to a middle split electrode 121b of three split electrodes 121a, 121b and 121c continuously arranged as shown in FIG. 4A, a first voltage is applied to the split electrode 121a at one side and a second voltage is applied to the split electrode 121c at the other side.

As shown in FIG. 4B, the cholesteric liquid crystals 141 and the dichroic dyes 142 are rotated helically by the chiral dopant at the focal conic state. Also, the cholesteric liquid crystals 141 and the dichroic dyes 142, which are arranged helically, are randomly arranged. At this time, the light incident upon the guest-host liquid crystal layer 140 is scattered by the cholesteric liquid crystals 141 or absorbed by the dichroic dyes 142. If the dichroic dyes 142 are black dyes, the guest-host liquid crystal layer 140 may shield the incident light by displaying a black color in the light shielding mode. Therefore, in the example embodiment of the present invention, the cholesteric liquid crystals 141 of the guest-host liquid crystal layer 140 may be controlled to have the focal conic state in the light shielding mode, whereby a rear background of the light controlling apparatus may not be displayed.

Meanwhile, if the cholesteric liquid crystals 141 and the dichroic dyes 142 are subjected to state transition from the homeotropic state to the focal conic state by the horizontal electric field hef, the guest-host liquid crystal layer 140 may maintain the focal conic state due to the chiral dopant even though the horizontal electric field hef is not applied any more. That is, the cholesteric liquid crystals 141 and the dichroic dyes 142 of the guest-host liquid crystal layer 140 may stably maintain the focal conic state due to the chiral dopant even though the horizontal electric field hef is not applied any more. Therefore, in the example embodiment of the present invention, even though no voltage is applied after state transition to the focal conic state, the light shielding mode may be realized, whereby power consumption may be reduced.

As described with reference to FIGS. 3A, 3B, 4A and 4B, in the example embodiment of the present invention, if the cholesteric liquid crystals 141 and the dichroic dyes 142 have properties of the positive type liquid crystals, state transition to the homeotropic state is generated by the vertical electric field vef, whereby the transparent mode may be realized, and state transition to the focal conic state is generated by the horizontal electric field hef, whereby the light shielding mode may be realized. For example, in the example embodiment of the present invention, if state transition to the homeotropic state is generated by the vertical electric field vef, the homeotropic state may be maintained even though no voltage is applied any more. Also, if state transition to the focal conic state is generated by the horizontal electric field hef, the focal conic state may be maintained even though no voltage is applied any more. That is, in the example embodiment of the present invention, because two stable states of the homeotropic state and the focal conic state may stably be maintained even though no voltage is applied any more after state transition, power consumption may be reduced. Also, because the transparent mode may be realized at the initial state that no voltage is applied, power consumption may be reduced.

Figure 5:
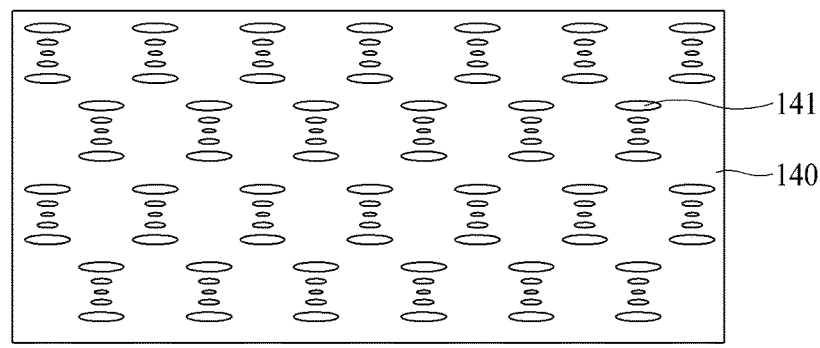
FIG. 5 is an exemplary view illustrating a cholesteric liquid crystal layer of a planar state.

The cholesteric liquid crystals 141 and the dichroic dyes 142 of the guest-host liquid crystal layer 140 may be controlled at the planar state in the light shielding mode as shown in FIG. 5. At the planar state, a helical axis of the cholesteric liquid crystals 141 and the dichroic dyes 142 may be arranged in a vertical direction (y-axis direction). If the cholesteric liquid crystals 141 and the dichroic dyes 142 of the guest-host liquid crystal layer 140 have properties of the positive type liquid crystals, the horizontal electric field hef should be applied to the liquid crystal layer 140 such that the guest-host liquid crystal layer 140 may be subjected to state transition from the homeotropic state to the planar state.

However, if the cholesteric liquid crystals 141 and the dichroic dyes 142 are subjected to state transition from the homeotropic state to the planar state, the horizontal electric field hef should be applied for a longer time than the time required for state transition from the homeotropic state to the focal conic state. Also, absorption and scattering of the light are simultaneously generated at the focal conic state, whereas absorption of the light is mainly generated at the planar state. Therefore, light shielding efficiency of the focal conic state is greater than that of the planar state. In the example embodiment of the present invention, although the cholesteric liquid crystals 141 of the guest-host liquid crystal layer 140 may be controlled at the planar state in the light shielding mode, the cholesteric liquid crystals 141 of guest-host liquid crystal layer 140 may be controlled at the focal conic state—not the planar state—to improve the light shielding ratio.

Figure 6:
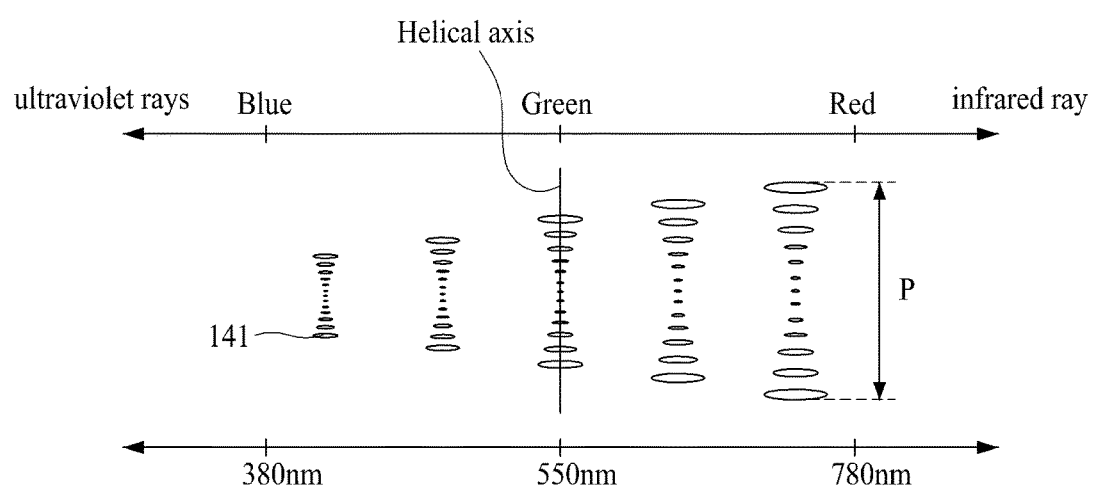
FIG. 6 is an exemplary view illustrating a reflective wavelength range according to a pitch of cholesteric liquid crystals.

As shown in FIG. 6, the pitch P of the cholesteric liquid crystals 141 arranged in a helical structure by the chiral dopant represents a length of a helical axis. The cholesteric liquid crystals 143 reflect light of a long wavelength if the pitch P of the cholesteric liquid crystals 141 arranged in a helical structure by the chiral dopant becomes greater, whereas the cholesteric liquid crystals 143 reflect light of a short wavelength if the pitch P of the cholesteric liquid crystals 141 becomes smaller. That is, light of a corresponding wavelength, which will be reflected by the cholesteric liquid crystal 143, may be determined depending on how the pitch P of the cholesteric liquid crystals 141 arranged in a helical structure by the chiral dopant is designed. The pitch P of the cholesteric liquid crystals 141 arranged in a helical structure by the chiral dopant may be controlled depending on the amount of the chiral dopant.

If the cholesteric liquid crystals 141 arranged in a helical structure by the chiral dopant reflect light of a visible ray wavelength range, some of visible rays may be reflected and then viewed by a user, whereby a light shielding ratio may be reduced. Also, to increase a light shielding ratio in the light shielding mode without deteriorating transmittance ratio in the transparent mode, the cholesteric liquid crystals 141 arranged in a helical structure by the chiral dopant may be designed to reflect light of an infrared wavelength range (780 nm or more) or an ultraviolet wavelength range (380 nm or less) not the visible ray wavelength range. The pitch P of the cholesteric liquid crystals 141 arranged in a helical structure by the chiral dopant may be varied depending on a wavelength range. The pitch P of the cholesteric liquid crystals 141 arranged in a helical structure by the chiral dopant may be calculated depending on an average refractive index n of the liquid crystals 141 and a reflective wavelength $\lambda$ of light which is to be reflected, as expressed by the following Equation 1.

$$P = \frac{\lambda}{n} \quad \text{[Equation 1]}$$

In Equation 1, P represents the pitch of the cholesteric liquid crystals 141 arranged in a helical structure by the chiral dopant, $\lambda$ represents a reflective wavelength that reflects light, and n represents an average refractive index of the cholesteric liquid crystals 141. For example, if the reflective wavelength $\lambda$ is 780 nm and the average refractive index n of the cholesteric liquid crystals 141 is 1.5, the pitch P of the cholesteric liquid crystals 141 arranged in a helical structure by the chiral dopant may be calculated as 520 nm. Also, if the reflective wavelength $\lambda$ is 380 nm and the average refractive index n of the cholesteric liquid crystals is 1.5, the pitch P of the cholesteric liquid crystals 141 arranged in a helical structure by the chiral dopant may be calculated as 253 nm. That is, the pitch P may be designed to be 253 nm or less, or 520 nm or more such that the reflective wavelength $\lambda$ of the cholesteric liquid crystals 141 arranged in a helical structure by the chiral dopant is 380 nm or less and 780 nm or more to reflect the infrared wavelength range (780 nm or more) or the ultraviolet wavelength range (380 nm or less) when the refractive index n of the cholesteric liquid crystals 141 is 1.5.

Figure 7A:
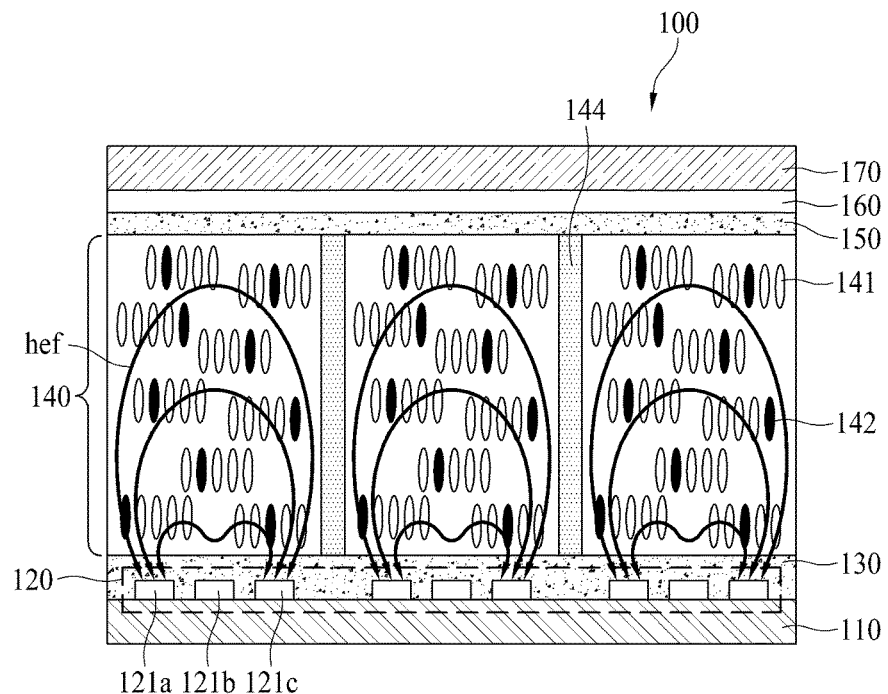
FIGS. 7A and 7B are cross-sectional views illustrating a light controlling apparatus of FIG. 2 in a transparent mode in the case of negative type liquid crystals.
Figure 7B:
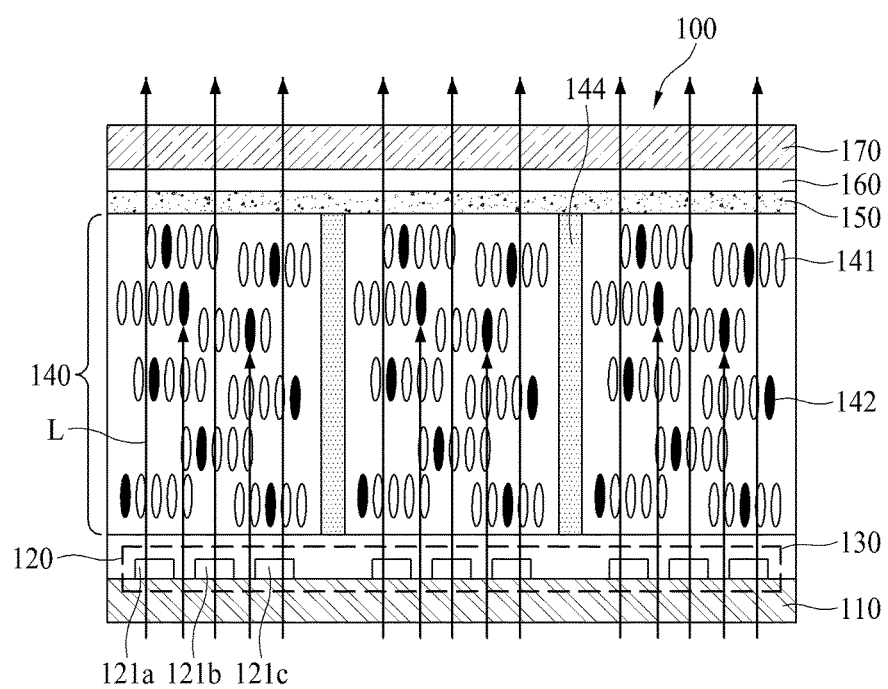

FIGS. 7A and 7B are cross-sectional views illustrating a light controlling apparatus of FIG. 2 in a transparent mode in the case of negative type liquid crystals. FIG. 7A is a cross-sectional view illustrating an electric field applied to realize a transparent mode in the case of negative type liquid crystals, and FIG. 7B is a cross-sectional view illustrating a light path in a transparent mode.

As shown in FIG. 7A, the cholesteric liquid crystals 141 of the guest-host liquid crystal layer 140 are controlled at the homeotropic state in the transparent mode. If the cholesteric liquid crystals 141 and the dichroic dyes 142 of the guest-host liquid crystal layer 140 have properties of the negative type liquid crystals, the horizontal electric field hef should be applied to the guest-host liquid crystal layer 140 such that the guest-host liquid crystal layer 140 may be subjected to state transition from the focal conic state or the planar state to the homeotropic state.

Meanwhile, in order that the vertical electric field vef is equally applied to the cholesteric liquid crystals 141 and the dichroic dyes 142 in the light shielding mode, the distance between the split electrodes 121 of the first electrode 120 should be formed to be smaller than two times of the width of each split electrode 121. At this time, a problem may occur in that the horizontal electric field hef may not be applied in the transparent mode due to a short distance between the split electrodes 121 which are adjacent to each other. Therefore, it may be preferable for the transparent mode that no voltage is applied to a middle split electrode 121b of three split electrodes 121a, 121b and 121c continuously arranged as shown in FIG. 7A, a first voltage is applied to the split electrode 121a at one side and a second voltage is applied to the split electrode 121c at the other side.

As shown in FIG. 7B, the cholesteric liquid crystals 141 and the dichroic dyes 142 are arranged in a vertical direction (y-axis direction) at the homeotropic state, and are not rotated helically. At this time, because the cholesteric liquid crystals 141 and the dichroic dyes 142 are arranged in an incident direction of light L, scattering and absorption of the light L incident upon the guest-host liquid crystal layer 140 are minimized. Therefore, most of the light L incident upon the light controlling apparatus 100 may pass through the guest-host liquid crystal layer 140.

Meanwhile, if the cholesteric liquid crystals 141 and the dichroic dyes 142 are subjected to state transition from the focal conic state or the planar state to the homeotropic state by the horizontal electric field hef, the cholesteric liquid crystals 141 and the dichroic dyes 142 of the guest-host liquid crystal layer 140 may maintain the homeotropic state due to the first and second alignment films 130 and 150 even though the horizontal electric field hef is not applied any more. That is, the cholesteric liquid crystals 141 and the dichroic dyes 142 of the guest-host liquid crystal layer 140 may stably maintain the homeotropic state due to the first and second alignment films 130 and 150 even though the horizontal electric field hef is not applied any more. Therefore, in the embodiment of the present invention, even though no voltage is applied after state transition to the homeotropic state, the transparent mode may be realized at the initial state, thereby reducing power consumption.

Figure 8A:
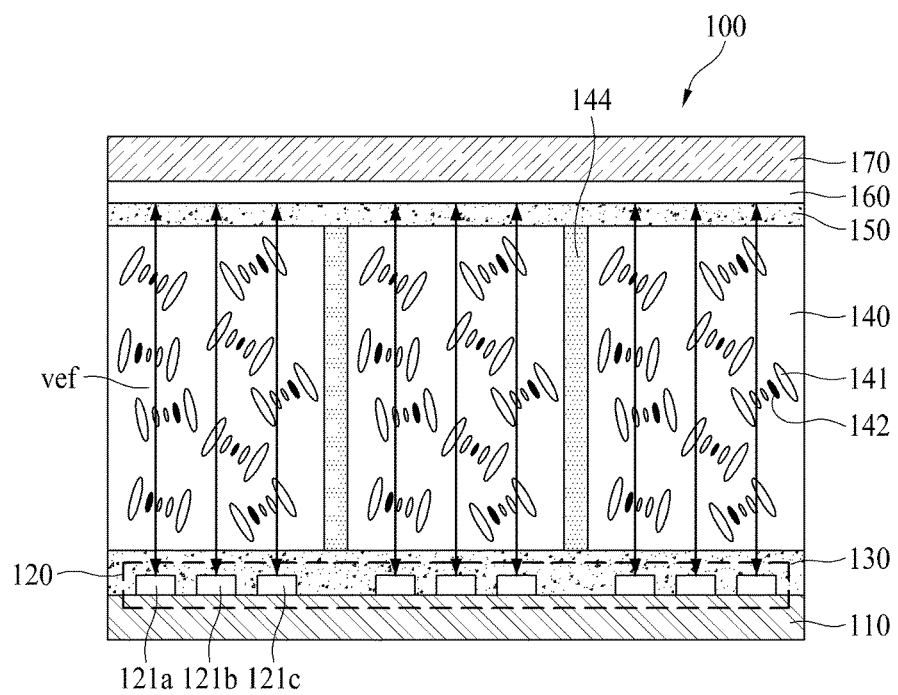
FIGS. 8A and 8B are cross-sectional views illustrating a light controlling apparatus of FIG. 2 in a light shielding mode in the case of negative type liquid crystals.
Figure 8B:
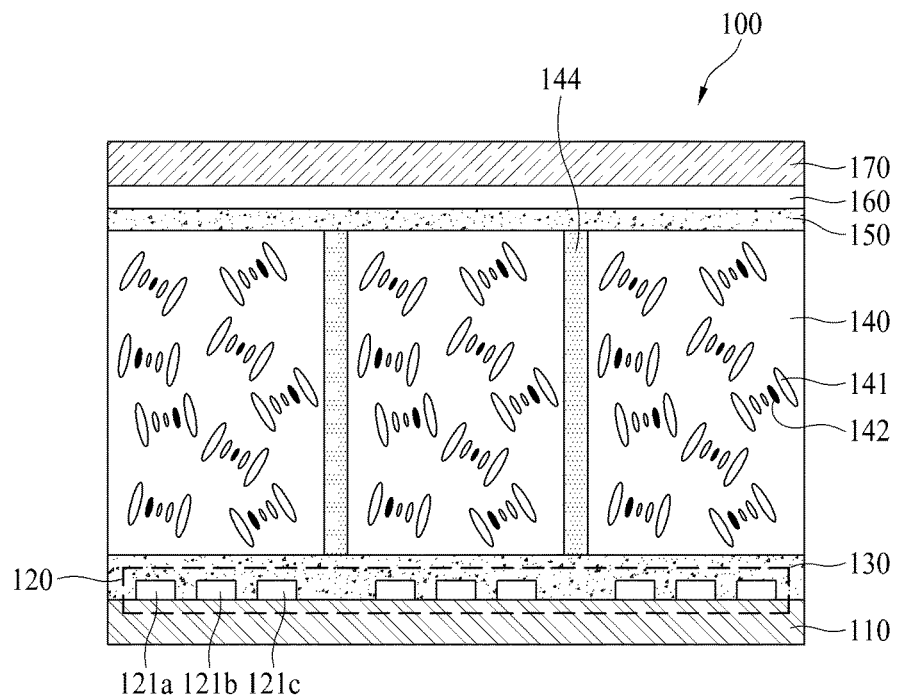

FIGS. 8A and 8B are cross-sectional views illustrating a light controlling apparatus of FIG. 2 in a light shielding mode in the case of negative type liquid crystals. FIG. 8A is a cross-sectional view illustrating an electric field applied to realize a light shielding mode in the case of negative type liquid crystals, and FIG. 8B is a cross-sectional view illustrating a light path in a light shielding mode.

As shown in FIG. 8A, the cholesteric liquid crystals 141 of the guest-host liquid crystal layer 140 are controlled at the focal conic state in the light shielding mode. If the cholesteric liquid crystals 141 and the dichroic dyes 142 of the guest-host liquid crystal layer 140 have properties of the negative type liquid crystals, the vertical electric field vef should be applied to the guest-host liquid crystal layer 140 such that the guest-host liquid crystal layer 140 may be subjected to state transition from the homeotropic state to the focal conic state.

Meanwhile, in order that the vertical electric field vef is equally applied to the cholesteric liquid crystals 141 and the dichroic dyes 142 in the light shielding mode, the distance between the split electrodes 121 of the first electrode 120 may be formed to be smaller than two times of the width of each split electrode 121. If the distance between the split electrodes 121 of the first electrode 120 is greater than two times of the width of each split electrode 121 or several tens of μm, a difference may occur between the vertical electric field vef applied to the cholesteric liquid crystals 141 and the dichroic dyes 142, which are arranged on the split electrodes 121, and the vertical electric field vef applied to the cholesteric liquid crystals 141 and the dichroic dyes 142, which are arranged between the split electrodes 121, whereby a problem may occur in that the vertical electric field vef may not be applied equally.

As shown in FIG. 8B, the cholesteric liquid crystals 141 and the dichroic dyes 142 are rotated helically by the chiral dopant at the focal conic state. Also, the cholesteric liquid crystals 141 and the dichroic dyes 142, which are arranged in a helical structure by the chiral dopant, are randomly arranged. In this case, the light L incident upon the guest-host liquid crystal layer 140 is scattered by the cholesteric liquid crystals 141 or absorbed by the dichroic dyes 142 as shown in FIG. 8B. If the dichroic dyes 142 are black dyes, the guest-host liquid crystal layer 140 may shield the incident light by displaying a black color in the light shielding mode. Therefore, in the example embodiment of the present invention, the cholesteric liquid crystals 141 and the dichroic dyes 142 of the guest-host liquid crystal layer 140 may be controlled to have the focal conic state in the light shielding mode, whereby a rear background of the light controlling apparatus may not be displayed.

Meanwhile, if the cholesteric liquid crystals 141 and the dichroic dyes 142 are subjected to state transition from the homeotropic state to the focal conic state by the vertical electric field vef, the cholesteric liquid crystals 141 and the dichroic dyes 142 of the guest-host liquid crystal layer 140 may maintain the focal conic state due to the chiral dopant even though the vertical electric field vef is not applied any more. That is, the cholesteric liquid crystals 141 and the dichroic dyes 142 of the guest-host liquid crystal layer 140 may stably maintain the focal conic state due to the chiral dopant. Therefore, in the example embodiment of the present invention, even though no voltage is applied after state transition to the focal conic state, the light shielding mode may be realized, thereby reducing power consumption.

As described with reference to FIGS. 7A, 7B, 8A and 8B, in the example embodiment of the present invention, if the cholesteric liquid crystals 141 and the dichroic dyes 142 have properties of the negative type liquid crystals, state transition to the homeotropic state is generated by the horizontal electric field hef, whereby the transparent mode may be realized, and state transition to the focal conic state is generated by the vertical electric field vef, whereby the light shielding mode may be realized. For example, in the example embodiment of the present invention, if state transition to the homeotropic state is generated by the horizontal electric field hef, the homeotropic state may be maintained even though no voltage is applied any more. Also, if state transition to the focal conic state is generated by the vertical electric field vef, the focal conic state may be maintained even though no voltage is applied any more. That is, in the example embodiment of the present invention, because two stable states of the homeotropic state and the focal conic state may stably be maintained even though no voltage is applied any more after state transition, power consumption may be reduced. Also, because the transparent mode may be realized at the initial state that no voltage is applied, power consumption may be reduced.

Figure 9:
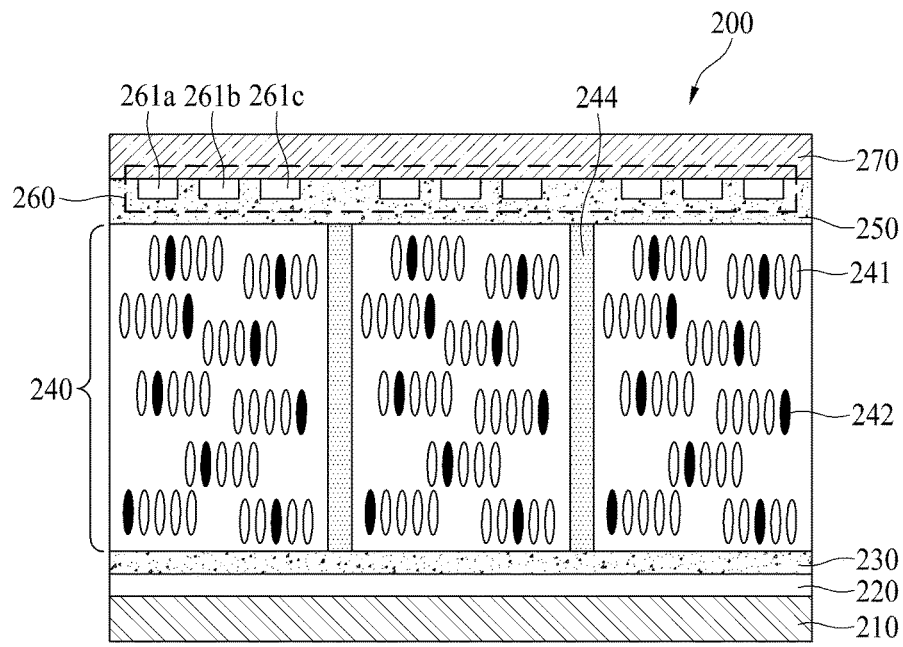
FIG. 9 is a cross-sectional view illustrating another detailed example of a light controlling apparatus of FIG. 1.

FIG. 9 is a cross-sectional view illustrating another detailed example of a light controlling apparatus of FIG. 1.

As shown in FIG. 9, the light controlling apparatus 200 according to another example embodiment of the present invention includes a first substrate 210, a first electrode 220, a first alignment film 230, a guest-host liquid crystal layer (GHLC) 240, a second alignment film 250, a second electrode 260, and a second substrate 270.

The first substrate 210, the first alignment film 230, the guest-host liquid crystal layer 240, the second alignment film 250 and the second substrate 270 of FIG. 9 are substantially the same as the first substrate 110, the first alignment film 130, the guest-host liquid crystal layer 140, the second alignment film 150 and the second substrate 170, which are described with reference to FIGS. 1 and 2. Therefore, a detailed description of the first substrate 210, the first alignment film 230, the guest-host liquid crystal layer 240, the second alignment film 250 and the second substrate 270 of FIG. 9 will be omitted.

The first electrode 220 is provided on the first substrate 210, and the second electrode 260 is provided on the second substrate 270. At least one of the first and second electrodes 220 and 260 may include split electrodes 261. In FIG. 9, the first electrode 220 is provided on the entirety of one surface of the first substrate 210, and the second electrode 260 is provided on one surface of the second substrate 270 as a plurality of split electrodes 261. However, the split electrodes may be electrodes patterned in a predetermined shape without limitation to the example of FIG. 9.

Each of the first and second electrodes 220 and 260 may be a transparent electrode. Alternatively, each of the first and second electrodes 220 and 260 may be formed of a transparent conductive material that has conductivity and at the same time may transmit external light. For example, each of the first and second electrodes 120 and 160 may be, but is not limited to, silver oxide (AgO or $Ag_2O$ or $Ag_2O_3$), aluminum oxide (e.g., $Al_2O_3$), tungsten oxide (e.g., $WO_2$ or $WO_3$ or $W_2O_3$), magnesium oxide (e.g., MgO), molybdenum oxide (e.g., $MoO_3$), zinc oxide (e.g., ZnO), tin oxide (e.g., $SnO_2$), indium oxide (e.g., $In_2O_3$), chrome oxide (e.g., $CrO_3$ or $Cr_2O_3$), antimony oxide (e.g., $Sb_2O_3$ or $Sb_2O_5$), titanium oxide (e.g., $TiO_2$), nickel oxide (e.g., NiO), copper oxide (e.g., CuO or $Cu_2O$), vanadium oxide (e.g., $V_2O_3$ or $V_2O_5$), cobalt oxide (e.g., CoO), iron oxide (e.g., $Fe_2O_3$ or $Fe_3O_4$), niobium oxide (e.g., $Nb_2O_5$), Indium Tin Oxide (ITO), Indium Zinc Oxide (IZO), Aluminum doped Zinc Oxide (ZAO), Aluminum Tin Oxide (TAO) or Antimony Tin Oxide (ATO).

The light controlling apparatus 200 may further include a voltage supply unit for supplying a predetermined voltage to each of the first and second electrodes 220 and 260. In the example embodiment of the present invention, cholesteric liquid crystals 241 included in the guest-host liquid crystal layer 240 may be state-transited in accordance with the voltages applied to the split electrodes 261 of the first electrode 220 and the second electrode 260, whereby the light shielding mode for shielding the incident light and the transparent mode for transmitting the incident light may be realized.

If cholesteric liquid crystals 241 and dichroic dyes 242 of the guest-host liquid crystal layer 240 have properties of the positive type liquid crystals, state transition of the guest-host liquid crystal layer 240 in the transparent mode and the light shielding mode will be substantially the same as the state transition described with reference to FIGS. 3A, 3B, 4A and 4B. Also, if the cholesteric liquid crystals 241 and the dichroic dyes 242 of the guest-host liquid crystal layer 240 have properties of the negative type liquid crystals, state transition of the cholesteric liquid crystals 243 included in the guest-host liquid crystal layer 240 in the transparent mode and the light shielding mode will be substantially the same as the state transition described with reference to FIGS. 7A, 7B, 8A and 8B.

Figure 10:
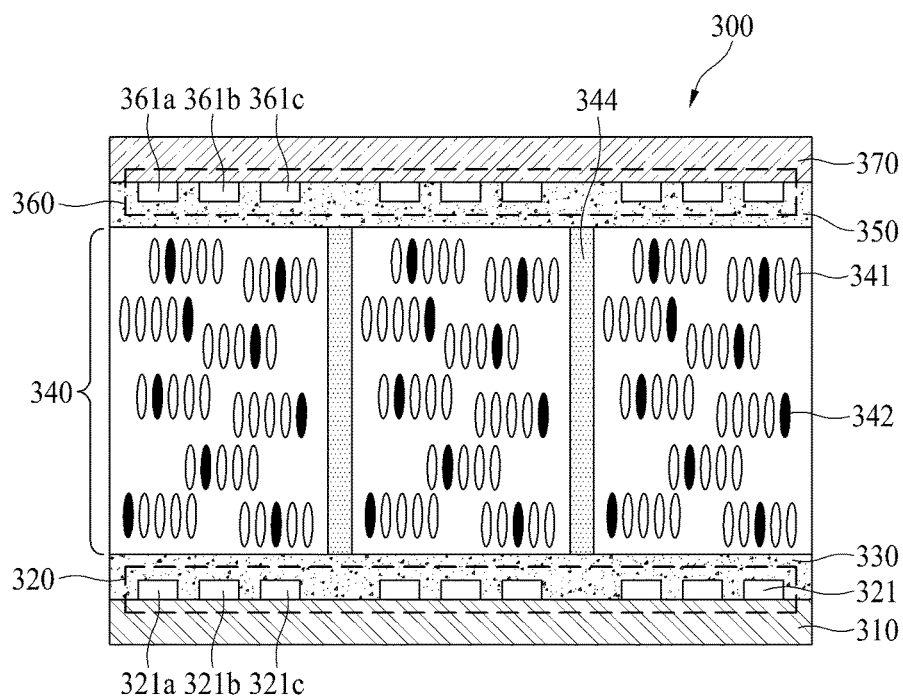
FIG. 10 is a cross-sectional view illustrating still another detailed example of a light controlling apparatus of FIG. 1.

FIG. 10 is a cross-sectional view illustrating still another detailed example of a light controlling apparatus of FIG. 1.

As shown in FIG. 10, the light controlling apparatus 300 according to still another example embodiment of the present invention includes a first substrate 310, a first electrode 320, a first alignment film 330, a guest-host liquid crystal layer (GHLC) 340, a second alignment film 350, a second electrode 360, and a second substrate 370.

The first substrate 310, the first alignment film 330, the guest-host liquid crystal layer 340, the second alignment film 350 and the second substrate 370 of FIG. 10 are substantially the same as the first substrate 110, the first alignment film 130, the guest-host liquid crystal layer 140, the second alignment film 150 and the second substrate 170, which are described with reference to FIGS. 1 and 2. Therefore, a detailed description of the first substrate 310, the first alignment film 330, the guest-host liquid crystal layer 340, the second alignment film 350 and the second substrate 370 of FIG. 10 will be omitted.

The first electrode 320 is provided on the first substrate 310, and the second electrode 360 is provided on the second substrate 370. At least one of the first and second electrodes 320 and 360 may include split electrodes. In FIG. 10, the first electrode 320 is provided on one surface of the first substrate 310 as a plurality of split electrodes 321, and the second electrode 360 is provided on one surface of the second substrate 370 as a plurality of split electrodes 361. However, the split electrodes may be pattern electrodes patterned in a predetermined shape without limitation to the example of FIG. 10.

Each of the first and second electrodes 320 and 360 may be a transparent electrode. For example, each of the first and second electrodes 320 and 360 may be formed of a transparent conductive material that has conductivity and at the same time may transmit external light. For example, each of the first and second electrodes 320 and 360 may be, but is not limited to, silver oxide (e.g., AgO or $Ag_2O$ or $Ag_2O_3$), aluminum oxide (e.g., $Al_2O_3$), tungsten oxide (e.g., $WO_2$ or $WO_3$ or $W_2O_3$), magnesium oxide (e.g., MgO), molybdenum oxide (e.g., $MoO_3$), zinc oxide (e.g., ZnO), tin oxide (e.g., $SnO_2$), indium oxide (e.g., $In_2O_3$), chrome oxide (e.g., $CrO_3$ or $Cr_2O_3$), antimony oxide (e.g., $Sb_2O_3$ or $Sb_2O_5$), titanium oxide (e.g., $TiO_2$), nickel oxide (e.g., NiO), copper oxide (e.g., CuO or $Cu_2O$), vanadium oxide (e.g., $V_2O_3$ or $V_2O_5$), cobalt oxide (e.g., CoO), iron oxide (e.g., $Fe_2O_3$ or $Fe_3O_4$), niobium oxide (e.g., $Nb_2O_5$), indium tin oxide (ITO), indium zinc oxide (IZO), aluminum doped zinc oxide (ZAO), aluminum tin oxide (TAO) or antimony tin oxide (ATO).

The light controlling apparatus 300 may further include a voltage supply unit for supplying a predetermined voltage to each of the first and second electrodes 320 and 360. In the example embodiment of the present invention, cholesteric liquid crystals included in the guest-host liquid crystal layer 340 may be state-transited in accordance with the voltages applied to the split electrodes 321 of the first electrode 320 and the split electrodes 361 of the second electrode 360, whereby the light shielding mode for shielding the incident light and the transparent mode for transmitting the incident light may be realized.

If cholesteric liquid crystals 341 and dichroic dyes 342 of the guest-host liquid crystal layer 340 have properties of the positive type liquid crystals, state transition of the guest-host liquid crystal layer 340 in the transparent mode and the light shielding mode will be substantially the same as the state transition described with reference to FIGS. 3A, 3B, 4A and 4B. Also, if the cholesteric liquid crystals 341 and the dichroic dyes 342 of the guest-host liquid crystal layer 340 have properties of the negative type liquid crystals, state transition of the guest-host liquid crystal layer 340 in the transparent mode and the light shielding mode will be substantially the same as the state transition described with reference to FIGS. 7A, 7B, 8A and 8B.

Figure 11A:
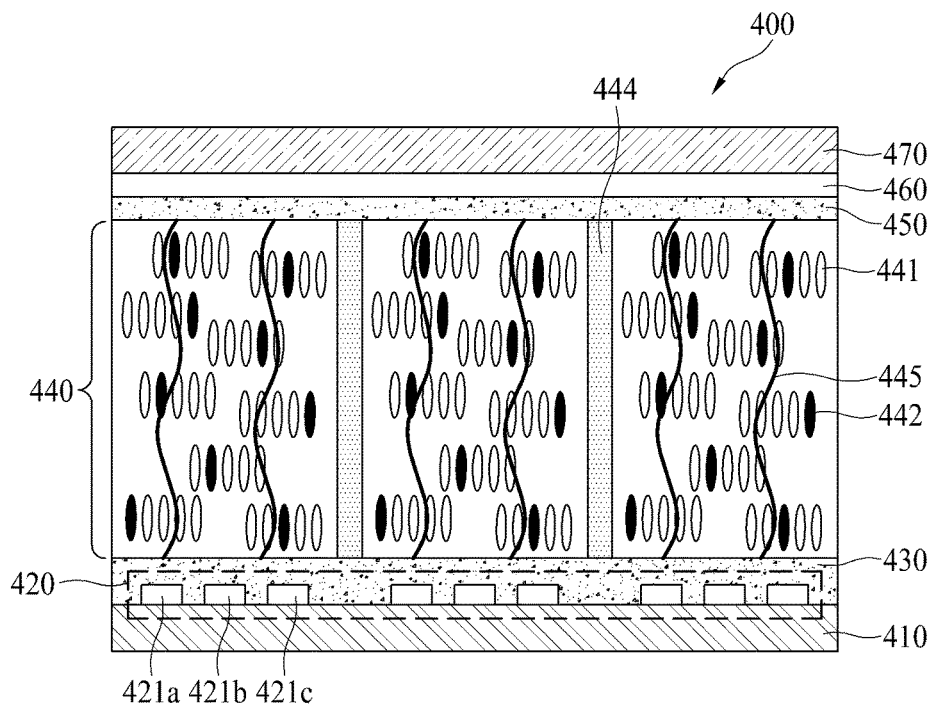
FIGS. 11A to 11C are cross-sectional views illustrating still other detailed examples of a light controlling apparatus of FIG. 1.

FIG. 11A is a cross-sectional view illustrating still another detailed example of a light controlling apparatus of FIG. 1.

As shown in FIG. 11A, the light controlling apparatus 400 according to still another example embodiment of the present invention includes a first substrate 410, a first electrode 420, a first alignment film 430, a guest-host liquid crystal layer (GHLC) 440, a second alignment film 450, a second electrode 460, and a second substrate 470.

The first substrate 410, the first electrode 420, the first alignment film 430, the second alignment film 450, the second electrode 460 and the second substrate 470 of FIG. 11A are substantially the same as the first substrate 110, the second electrode 120, the first alignment film 130, the second alignment film 150, the second electrode 160 and the second substrate 170, which are described with reference to FIGS. 1 and 2. Therefore, a detailed description of the first substrate 410, the first electrode 420, the first alignment film 430, the second alignment film 450, the second electrode 460, and the second substrate 470 of FIG. 11A will be omitted.

The guest-host liquid crystal layer 440 is provided between the first alignment film 430 and the second alignment film 450. The guest-host liquid crystal layer 440 may be state-transited to the planar state, the focal conic state and the homeotropic state. In the example embodiment of the present invention, the guest-host liquid crystal layer 440 may be controlled at the homeotropic state in the transparent mode and controlled at the focal conic state in the light shielding mode.

The guest-host liquid crystal layer 440 may include the cholesteric liquid crystals 441 and dichroic dyes 442, spacers 444, and polymer networks 445. Also, the guest-host liquid crystal layer 440 may further include a chiral dopant or photo-sensitive chiral dopant, which derives a helical structure, and a photoinitiator in the cholesteric liquid crystals 441 and the dichroic dyes 442. The cholesteric liquid crystals 441, the dichroic dyes 442 and the spacers 444 of FIG. 11A are substantially the same as the cholesteric liquid crystals 141, the dichroic dyes 142 and the spacers 144, which are described with reference to FIGS. 1 and 2. Therefore, a detailed description of the cholesteric liquid crystals 441, the dichroic dyes 442 and the spacers 444 of FIG. 11A will be omitted.

The polymer networks 445 may be formed by mixing a monomer with the guest-host liquid crystal layer 440 and UV hardening the mixture of the monomer with the guest-host liquid crystal, and have a structure that a polymer is formed in a shape of a net. The polymer networks 445 may be formed to have a refractive index similar to a short-axial refractive index of the cholesteric liquid crystals 441. For example, if the guests-host liquid crystal layer 430 includes the cholesteric liquid crystals 431 of which refractive index is 1.4, a monomer which will be used as a material of the polymer networks 445 may be any one among various compounds of materials, of which refractive index is 1.4.

The polymer networks 445 may scatter incident light. Therefore, the guest-host liquid crystal layer 440 that includes the polymer networks 445 may scatter the incident light more than the guest-host liquid crystal layer 440 that does not include the polymer networks 445. For this reason, a path of light incident upon the guest-host liquid crystal layer 440 that includes the polymer networks 445 becomes longer than that of light incident upon the guest-host liquid crystal layer 440 that does not include the polymer networks 445. Therefore, the light incident upon the guest-host liquid crystal layer 440 that includes the polymer networks 445 may be more absorbed by the dichroic dyes 442. As a result, if the guest-host liquid crystal layer includes the polymer networks 445 in the same manner as the example embodiment of the present invention, the light shielding ratio may be increased more than light shielding ratio performed without the polymer networks 445.

If the cholesteric liquid crystals 441 and dichroic dyes 442 of the guest-host liquid crystal layer 440 have properties of the positive type liquid crystals, state transition of the guest-host liquid crystal layer 440 in the transparent mode and the light shielding mode will be substantially the same as the state transition described with reference to FIGS. 3A, 3B, 4A and 4B. Also, if the cholesteric liquid crystals 441 and the dichroic dyes 442 of the guest-host liquid crystal layer 440 have properties of the negative type liquid crystals, state transition of the guest-host liquid crystal layer 440 in the transparent mode and the light shielding mode will be substantially the same as the state transition described with reference to FIGS. 7A, 7B, 8A and 8B.

Figure 11B:
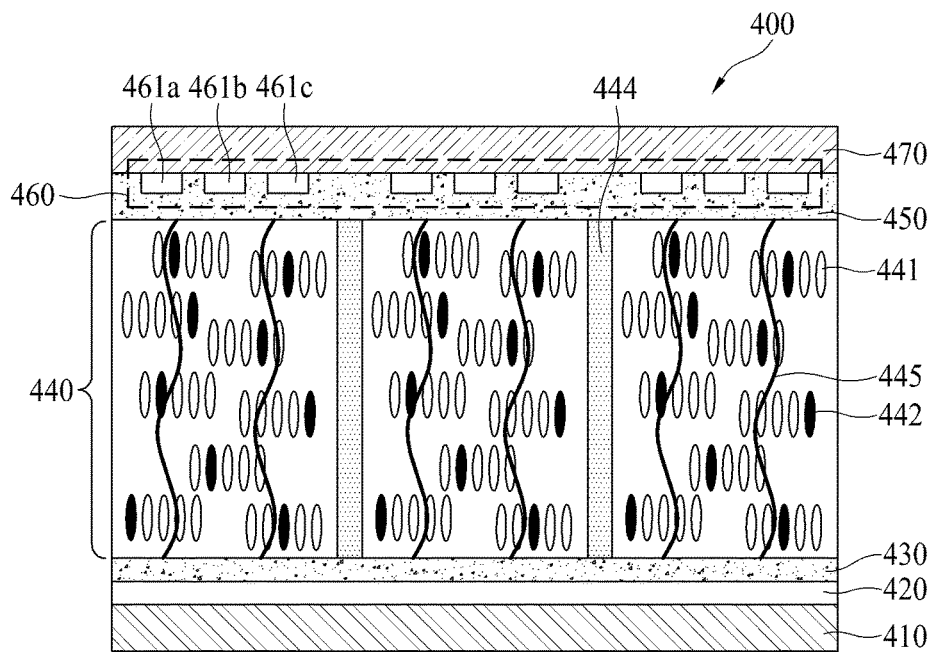
Figure 11C:
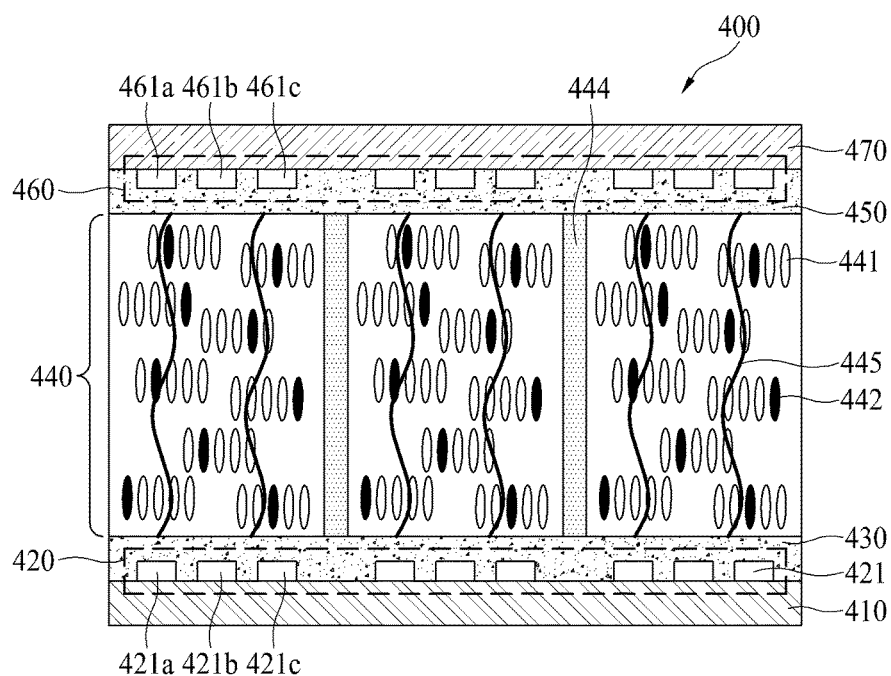

Also, in FIG. 11A, the first electrode 420 includes split electrodes 421, and the second electrode 460 is provided on the entirety of one surface of the second substrate 470. However, the first electrode 420 and the second electrode 460 are not limited to the example of FIG. 11A. That is, at least one of the first and second electrodes 420 and 460 may include split electrodes. Therefore, the second electrode 460 may include split electrodes as shown in FIG. 11B, and both of the first and second electrodes 420 and 460 may include split electrodes as shown in FIG. 11C. The split electrodes may be the electrodes patterned in a predetermined shape.

Figure 12A:
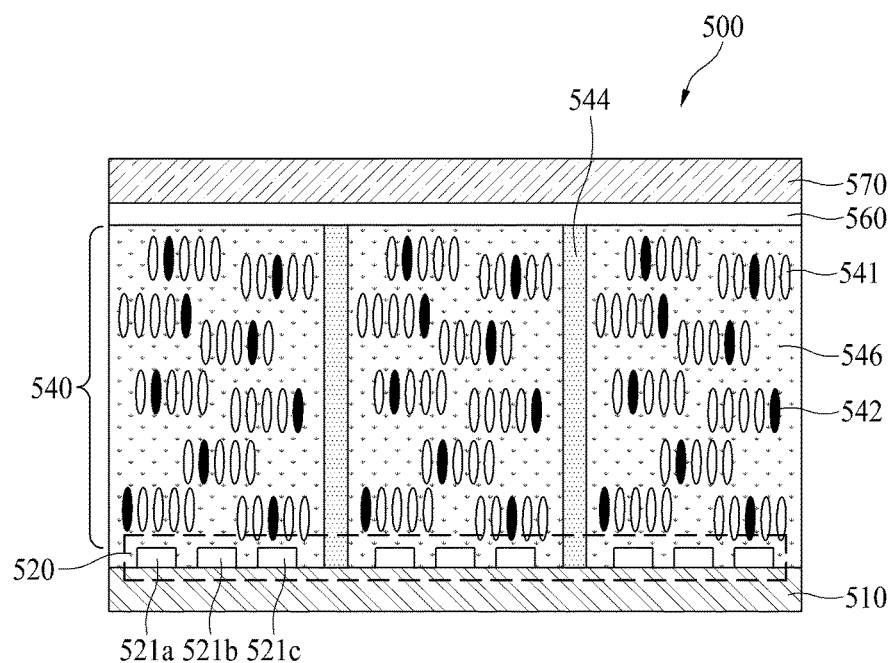
FIGS. 12A to 12C are cross-sectional views illustrating still other detailed examples of a light controlling apparatus of FIG. 1.

FIG. 12A is a cross-sectional view illustrating still another detailed example of a light controlling apparatus of FIG. 1.

As shown in FIG. 12A, the light controlling apparatus 500 according to still another example embodiment of the present invention includes a first substrate 510, a first electrode 520, a guest-host liquid crystal layer (GHLC) 540, a second electrode 560, and a second substrate 570.

The first substrate 510, the first electrode 520, the second electrode 560 and the second substrate 570 of FIG. 12A are substantially the same as the first substrate 110, the first electrode 120, the second electrode 160 and the second substrate 170, which are described with reference to FIGS. 1 and 2. Therefore, a detailed description of the first substrate 510, the first electrode 520, the second electrode 560 and the second substrate 570 of FIG. 12A will be omitted.

The guest-host liquid crystal layer 540 is provided between the first alignment film 520 and the second alignment film 560. The guest-host liquid crystal layer 540 may be state-transited to the planar state, the focal conic state and the homeotropic state. In the example embodiment of the present invention, the guest-host liquid crystal layer 540 may be controlled at the homeotropic state in the transparent mode and controlled at the focal conic state in the light shielding mode.

The guest-host liquid crystal layer 540 may include the cholesteric liquid crystals 541, dichroic dyes 542, spacers 544, and a vertical alignment material 546. Also, the guest-host liquid crystal layer 540 may further include a chiral dopant or photo-sensitive chiral dopant, which derives a helical structure, and a photoinitiator in the cholesteric liquid crystals 541 and the dichroic dyes 542. The cholesteric liquid crystals 541, the dichroic dyes 542 and the spacers 544 of FIG. 12A are substantially the same as the cholesteric liquid crystals 141, the dichroic dyes 142 and the spacers 144, which are described with reference to FIGS. 1 and 2. Therefore, a detailed description of the cholesteric liquid crystals 541, the dichroic dyes 542 and the spacers 544 of FIG. 12A will be omitted.

because the light controlling apparatus 500 of FIG. 12A does not include first and second alignment films, the vertical alignment material 546 is added to the guest-host liquid crystal layer 540 to align the plurality of liquid crystals 541 and the dichroic dyes 542 in a vertical direction. The vertical alignment material 546 may be, but is not limited to, at least one among HTAB (hexadecyltrimethylammonium bromide), CTAB (cetyl trimethyl ammonium bromide), POSS (polyhedral oligomeric silsesquioxane), dendronized polymer, dendrimer and their mixture. For example, if the vertical alignment material is HTAB or CTAB, the HTAB or CTAB adhere to the first and second electrodes 520 and 560 and then aligned vertically like a surfactant, and the cholesteric liquid crystals 541 and the dichroic dyes 542 may be aligned vertically by the vertically aligned HTAB or CTAB.

The vertical alignment material 546 may be included in the guest-host liquid crystal layer 540 in the range of 0.01 wt % to 1 wt %. If the vertical alignment material 546 is included in the guest-host liquid crystal layer 540 to be smaller than 0.01 wt %, the cholesteric liquid crystals 541 and the dichroic dyes 542 may not be arranged in a vertical direction. Also, if the vertical alignment material 546 is included in the guest-host liquid crystal layer 540 to be greater than 1 wt %, the vertical alignment material 546 may not be dissolved completely.

If the cholesteric liquid crystals 541 and the dichroic dyes 542 of the guest-host liquid crystal layer 540 have properties of the positive type liquid crystals, state transition of the cholesteric liquid crystals 541 included in the guest-host liquid crystal layer 540 in the transparent mode and the light shielding mode will be substantially the same as the state transition described with reference to FIGS. 3A, 3B, 4A and 4B. Also, if the cholesteric liquid crystals 541 and the dichroic dyes 542 of the guest-host liquid crystal layer 540 have properties of the negative type liquid crystals, state transition of the cholesteric liquid crystals 543 included in the guest-host liquid crystal layer 540 in the transparent mode and the light shielding mode will be substantially the same as the state transition described with reference to FIGS. 7A, 7B, 8A and 8B.

Figure 12B:
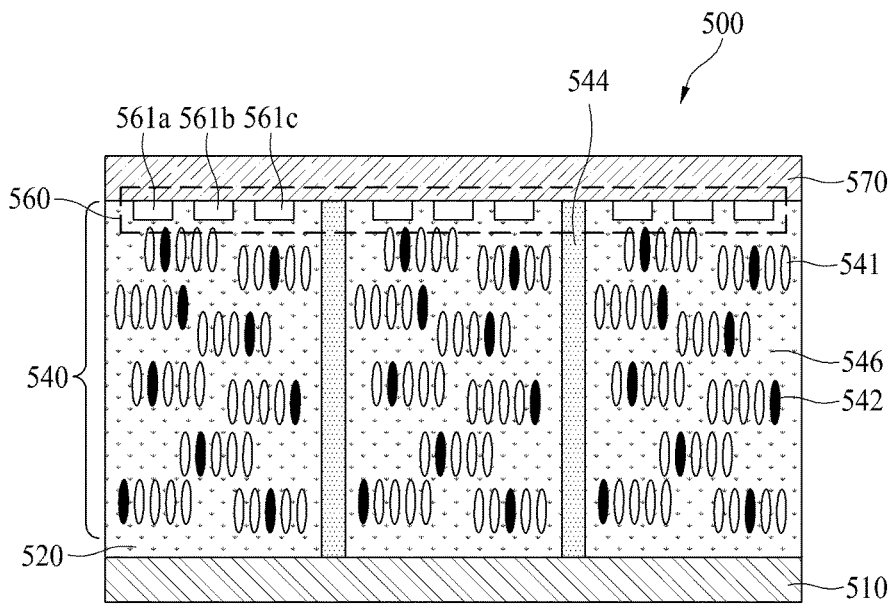
Figure 12C:
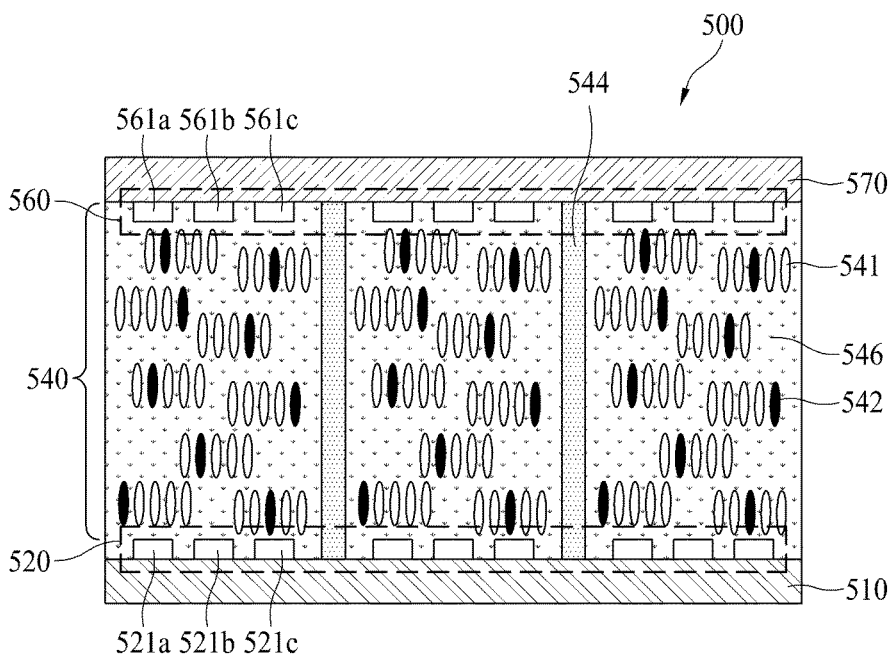

Also, in FIG. 12A, the first electrode 520 includes split electrodes 521a, 521b and 521c, and the second electrode 560 is provided on the entirety of one surface of the second substrate 570. However, the first electrode 520 and the second electrode 560 are not limited to the example of FIG. 12A. That is, at least one of the first and second electrodes 520 and 560 may include split electrodes. For example, the second electrode 560 may include split electrodes 561a, 561b and 561c as shown in FIG. 12B, and both of the first and second electrodes 520 and 560 may include split electrodes 521a, 521b, 521c, 561a, 561b and 561c as shown in FIG. 12C. The split electrodes may be the electrodes patterned in a predetermined shape.

Figure 13A:
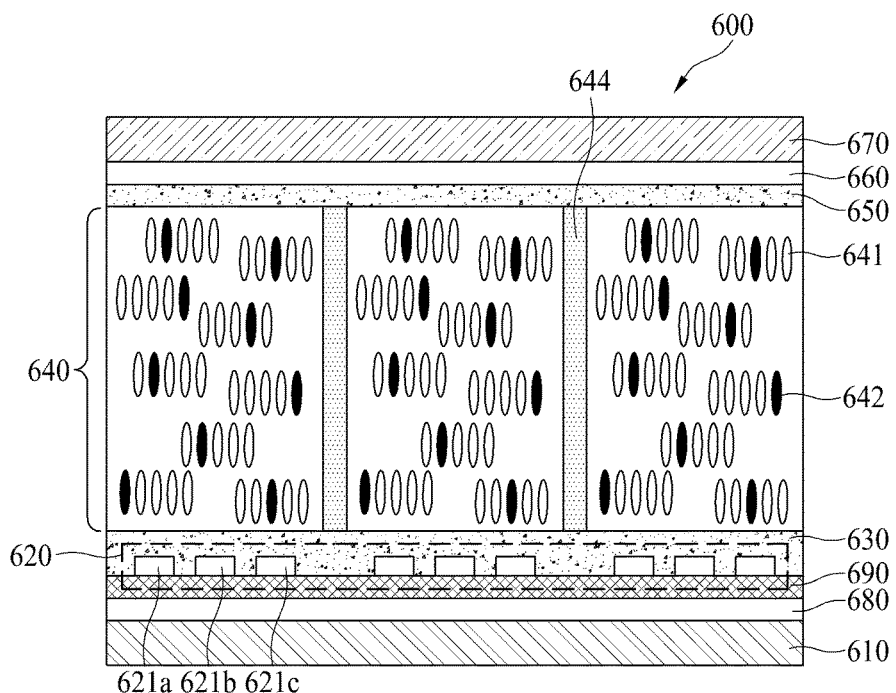
FIGS. 13A to 13C are cross-sectional views illustrating still other detailed examples of a light controlling apparatus of FIG. 1.

FIG. 13A is a cross-sectional view illustrating still another detailed example of a light controlling apparatus of FIG. 1.

As shown in FIG. 13A, a light controlling apparatus 600 according to still another example embodiment of the present invention includes a first substrate 610, a first electrode 620, a first alignment film 630, a guest-host liquid crystal layer 640, a second alignment film 650, a second electrode 660, a second substrate 670, a third electrode 680, and an insulating film 690.

The first substrate 610, the guest-host liquid crystal layer 640, the second alignment film 650, the second electrode 660 and the second substrate 670 of FIG. 13A are substantially the same as the first substrate 110, the guest-host liquid crystal layer 140, the second alignment film 150, the second electrode 160, and the second substrate 170, which are described with reference to FIGS. 1 and 2. Therefore, a detailed description of the first substrate 610, the guest-host liquid crystal layer 640, the second alignment film 650, the second electrode 660 and the second substrate 670 of FIG. 13A will be omitted.

The third electrode 680 is provided on the first substrate 610, and the insulating film 690 is provided on the third electrode 680. In FIG. 13A, the first electrode 620 includes split electrodes 621a, 621b and 621c, and the third electrode 680 is provided on the entirety of one surface of the first substrate 610. The split electrodes may be electrodes patterned in a predetermined shape.

Each of the first and third electrodes 620 and 680 may be a transparent electrode. For example, each of the first and third electrodes 620 and 680 may be formed of a transparent conductive material that has conductivity and at the same time may transmit external light. For example, each of the first and third electrodes 620 and 680 may be, but is not limited to, silver oxide (e.g., AgO or $Ag_2O$ or $Ag_2O_3$), aluminum oxide (e.g., $Al_2O_3$), tungsten oxide (e.g., $WO_2$ or $WO_3$ or $W_2O_3$), magnesium oxide (e.g., MgO), molybdenum (e.g., $MoO_3$), zinc oxide (e.g., ZnO), tin oxide (e.g., $SnO_2$), indium oxide (e.g., $In_2O_3$), chrome oxide (e.g., $CrO_3$ or $Cr_2O_3$), antimony oxide (e.g., $Sb_2O_3$ or $Sb_2O_5$), titanium oxide (e.g., $TiO_2$), nickel oxide (e.g., NiO), copper oxide (e.g., CuO or $Cu_2O$), vanadium oxide (e.g., $V_2O_3$ or $V_2O_5$), cobalt oxide (e.g., CoO), iron oxide (e.g., $Fe_2O_3$ or $Fe_3O_4$), niobium oxide (e.g., $Nb_2O_5$), indium tin oxide (ITO), indium zinc oxide (IZO), aluminum doped zinc oxide (ZAO), aluminum tin oxide (TAO) or antimony tin oxide (ATO).

The first alignment film 630 is provided on the first electrode 620 and the insulating film 690. The first alignment film 630 may be formed of a vertical alignment material for aligning cholesteric liquid crystals 641 and the dichroic dyes 642 in a vertical direction (y-axis direction). The cholesteric liquid crystals 641 and the dichroic dyes 642 of the guest-host liquid crystal layer 640 may be arranged in a vertical direction (y-axis direction) due to the first and second alignment films 630 and 650 even though the electric field is not applied. The first alignment film 630 may be formed of any one of polyimide and phosphatidylcholine (PPC). Alternatively, the first alignment film 630 may be formed by mixing HTAB (hexadecyltrimethylammonium bromide) or CTAB (cetyl trimethyl ammonium bromide) with a solvent, such as isopropyl alcohol (IPA), coating the mixture on the first electrode 620 and the second electrode 660 and evaporating the solvent. The material of the first alignment film 630 is not limited to the above examples.

Meanwhile, if the first electrode 620 includes the split electrodes 621a, 621b and 621c, distance among the split electrodes 621a, 621b and 621c of the first electrode 620 should be controlled to equally apply the vertical electric field vef to the cholesteric liquid crystals 641 and the dichroic dyes 642 as described with reference to FIGS. 3A and 8A. However, in the example embodiment of the present invention, because the third electrode 690 is provided on the entirety of one surface of the first substrate 610, the vertical electric field may be formed between the second electrode 660 and the third electrode 680. Therefore, in the example embodiment of the present invention, the vertical electric field may equally be applied to the cholesteric liquid crystals 641 and the dichroic dyes 642. If the vertical electric field is formed between the second electrode 660 and the third electrode 680, no voltage is applied to the first electrode 620.

Also, in the example embodiment of the present invention, the horizontal electric field may include a fringe field between the split electrodes 621a, 621b and 621c of the first electrode 620 and the third electrode 680. Therefore, in the example embodiment of the present invention, because the horizontal electric field may be formed in such a manner that a first voltage is applied to the split electrodes 621a, 621b and 621c of the first electrode 620 and a second voltage is applied to the third electrode 680, whereby the horizontal electric field may be formed more easily than the case where no voltage is applied to the middle split electrode 121b, the first voltage is applied to the split electrode 121a at one side and the second voltage is applied to the split electrode 121c at the other side among the three split electrodes 121a, 121b and 121c continuously arranged as shown in FIG. 4A.

If the cholesteric liquid crystals 641 and the dichroic dyes 642 of the guest-host liquid crystal layer 640 have properties of the positive type liquid crystals, state transition of the guest-host liquid crystal layer 640 in the transparent mode and the light shielding mode will be substantially the same as the state transition described with reference to FIGS. 3A, 3B, 4A and 4B except that the third electrode 680 is additionally provided to form the vertical electric field and the horizontal electric field. Also, if the cholesteric liquid crystals 641 and the dichroic dyes 642 of the guest-host liquid crystal layer 640 have properties of the negative type liquid crystals, state transition of the guest-host liquid crystal layer 640 in the transparent mode and the light shielding mode will be substantially the same as the state transition described with reference to FIGS. 7A, 7B, 8A and 8B except that the third electrode 680 is additionally provided to form the vertical electric field and the horizontal electric field.

Also, in FIG. 13A, although the third electrode 680 is provided on the entirety of one surface of the first substrate 610, the second electrode 660 is provided on the entirety of one surface of the second substrate 670, and the first electrode 620 includes split electrodes 621a, 621b and 621c on the insulating film 690, the first to third electrodes are not limited to the example of FIG. 13A. That is, at least one of the first and second electrodes 620 and 660 may include split electrodes. The second electrode 660 may be comprised by forming a material for forming the second electrode 660 on the entirety of one surface of the second substrate 670. Alternatively, the second electrode 660 may be comprised by forming a material for forming the second electrode 660 on the entirety of one surface of the second substrate 670 and then patterning the material.

Figure 13B:
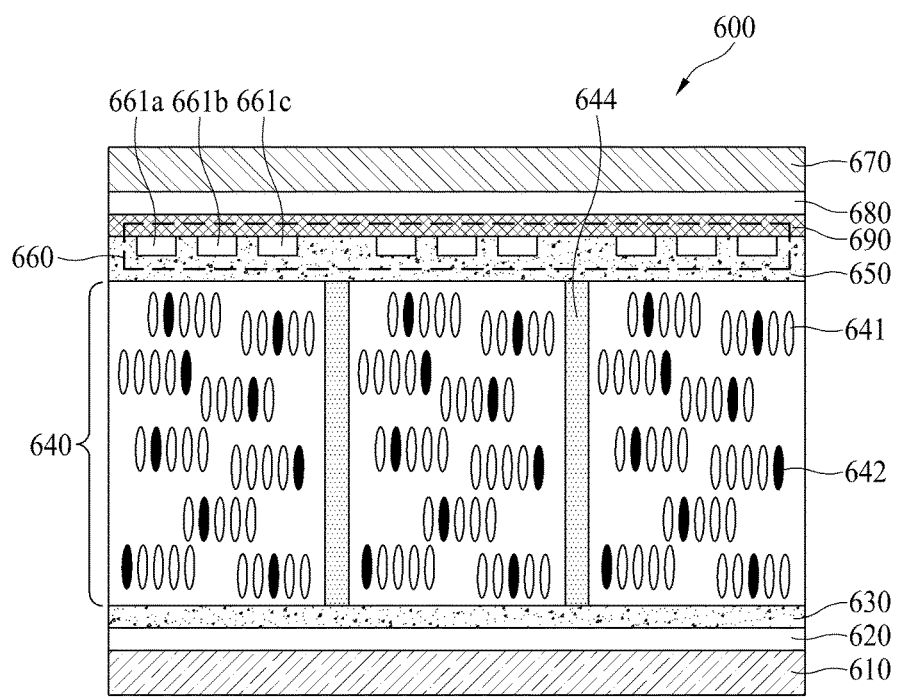

For example, as shown in FIG. 13B, the first electrode 620 may be provided on the entirety of one surface of the first substrate 610, the third electrode 680 may be provided on the entirety of one surface of the second substrate 670, and the second electrode 660 may include split electrodes 661a, 661b and 661c on the insulating film 690. At this time, in the example embodiment of the present invention, the vertical electric field is formed between the first electrode 620 and the third electrode 680, and the horizontal electric field is formed between the second electrode 660 and the third electrode 680. The first electrode 620 may be comprised by forming a material for forming the first electrode 620 on the entirety of one surface of the first substrate 610. Alternatively, the first electrode 620 may be comprised by forming a material for forming the first electrode 620 on the entirety of one surface of the first substrate 610 and then patterning the material.

Figure 13C:
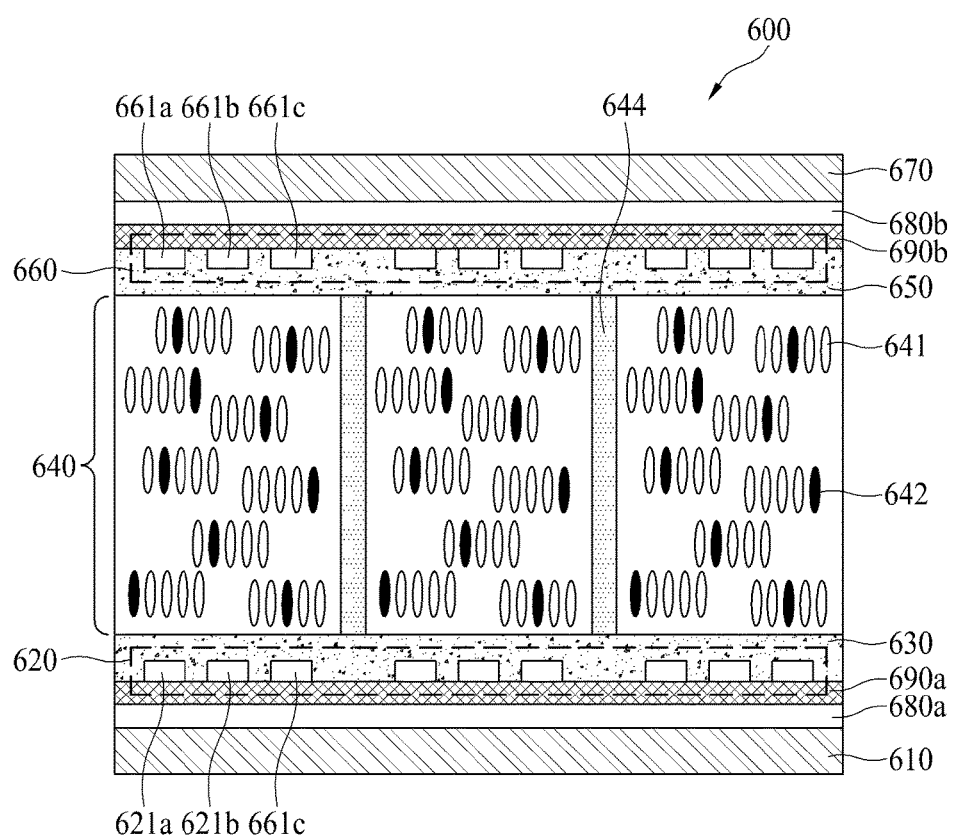

Alternatively, as shown in FIG. 13C, the first and second electrodes 620 and 660 may include split electrodes 621a, 621b, 621c, 661a, 661b and 661c. For example, as shown in FIG. 13C, a third electrode 680a may be provided on the entirety of one surface of the first substrate 610, a fourth electrode 680b may be provided on the entirety of one surface of the second substrate 670, the first electrode 620 may include split electrodes 621a, 621b and 621c on a first insulating film 690a, and the second electrode 660 may include split electrodes 661a, 661b and 661c on a second insulating film 690b. In this case, in the example embodiment of the present invention, the vertical electric field is formed by the third electrode 680a and the fourth electrode 680b, and the horizontal electric field is formed by either the first electrode 620 and the third electrode 680a, or the second electrode 660 and the fourth electrode 680b. The third electrode 680a may be comprised by forming a material for forming the third electrode 680a on the entirety of one surface of the first substrate 610. Alternatively, the third electrode 680a may be comprised by forming a material for forming the third electrode 680a on the entirety of one surface of the second substrate 670 and then patterning the material. The fourth electrode 680b may be comprised by forming a material for forming the fourth electrode 680b on the entirety of one surface of the second substrate 670. Alternatively, the fourth electrode 680b may be comprised by forming a material for forming the fourth electrode 680b on the entirety of one surface of the second substrate 670 and then patterning the material.

Figure 14A:
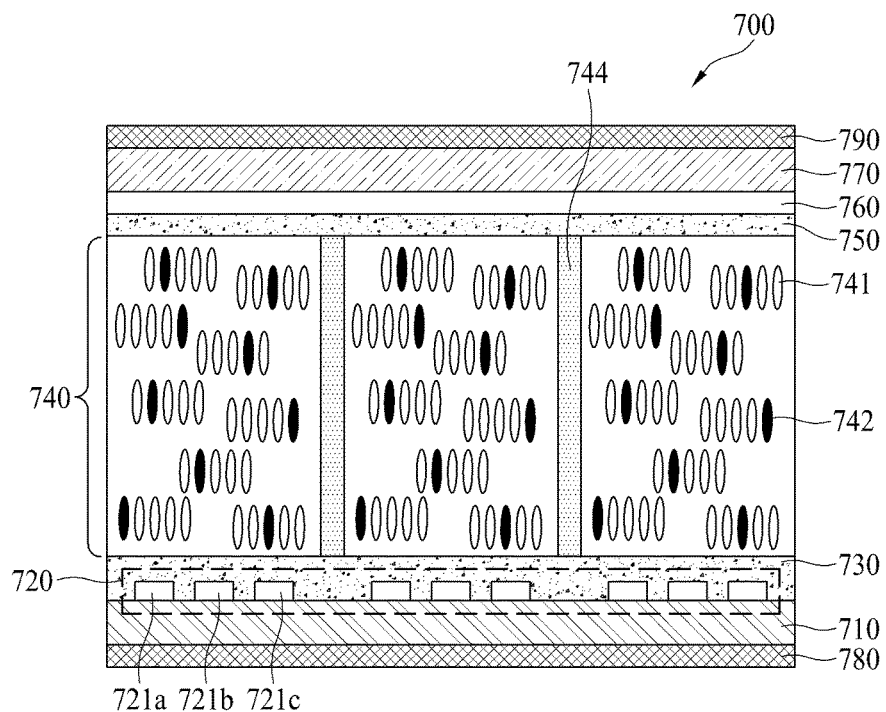
FIGS. 14A to 14C are cross-sectional views illustrating still other detailed examples of a light controlling apparatus of FIG. 1.
Figure 14B:
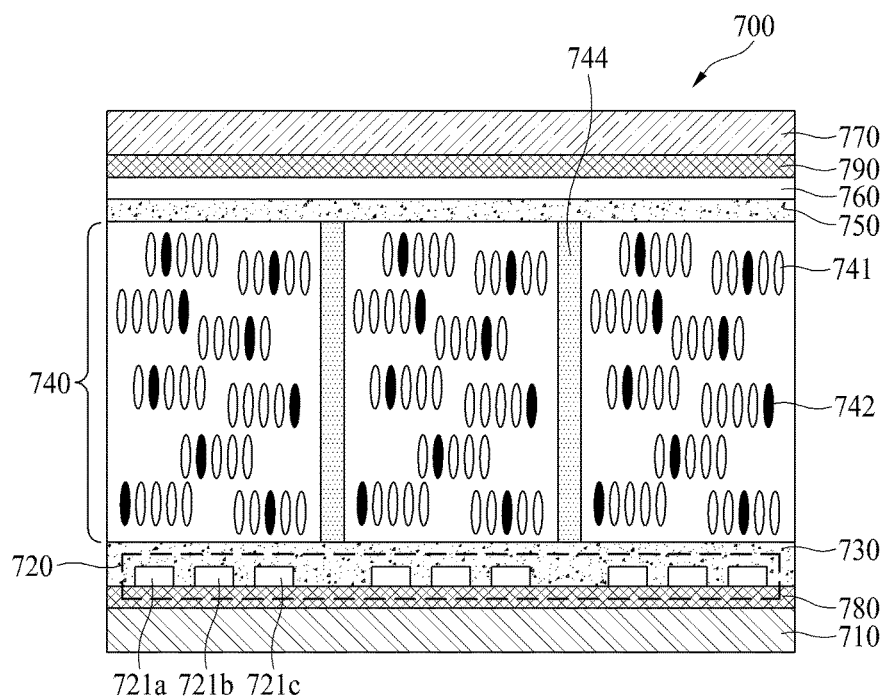
Figure 14C:
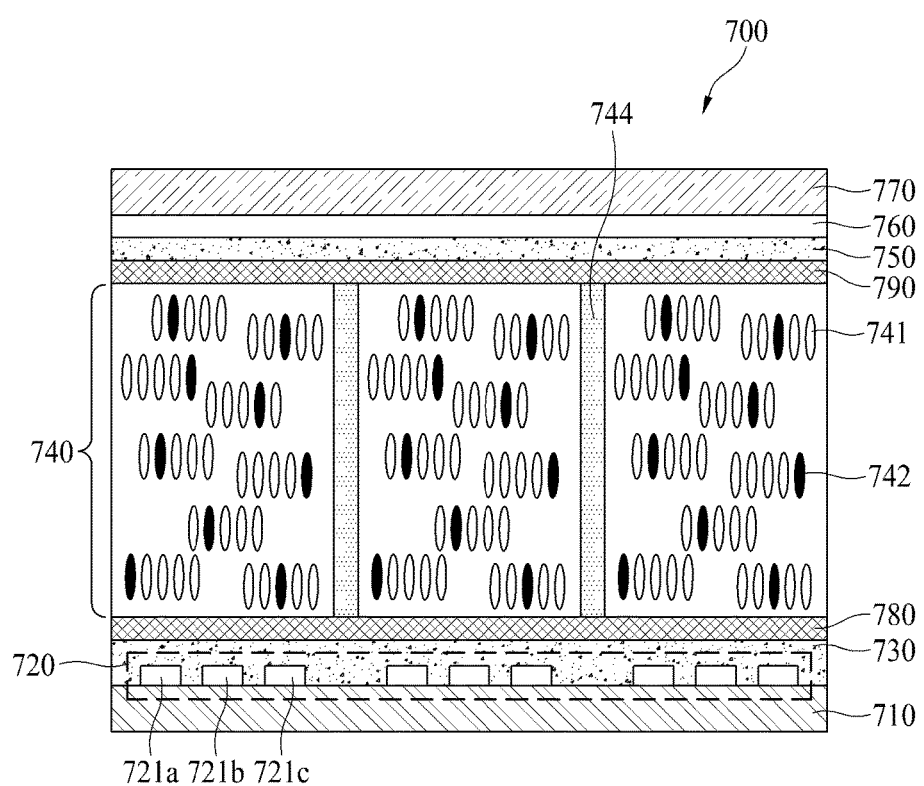

The light controlling apparatus according to the example embodiment of the present invention may further include refractive index matching layers as shown in FIGS. 14A to 14C. Hereinafter, the light controlling apparatus that further includes refractive index matching layers will be described in detail with reference to FIGS. 14A to 14C.

FIG. 14A is a cross-sectional view illustrating still another detailed example of a light controlling apparatus of FIG. 1.

As shown in FIG. 14A, a light controlling apparatus 700 according to still another example embodiment of the present invention includes a first substrate 710, a first electrode 720, a first alignment film 730, a guest-host liquid crystal layer 740, a second alignment film 750, a second electrode 760, a second substrate 770, a first refractive index matching layer 780, and a second refractive index matching layer 790.

The first substrate 710, the first electrode 720, the first alignment film 730, the guest-host liquid crystal layer 740, the second alignment film 750, the second electrode 760 and the second substrate 770 of FIG. 14A are substantially the same as the first substrate 110, the first electrode 120, the first alignment film 130, the guest-host liquid crystal layer 140, the second alignment film 150, the second electrode 160, and the second substrate 170, which are described with reference to FIGS. 1 and 2. Therefore, a detailed description of the first substrate 710, the first electrode 720, the first alignment film 730, the guest-host liquid crystal layer 740, the second alignment film 750, the second electrode 760 and the second substrate 770 of FIG. 14A will be omitted.

The first refractive index matching layer 780 may be provided on an opposite surface of one surface of the first substrate 710, on which the first electrode 720 is provided. That is, the first electrode 720 may be provided on one surface of the first substrate 710, and the first refractive index matching layer 780 may be provided on the other surface corresponding to the opposite surface of the one surface of the first substrate 710.

Fresnel reflection may be generated due to a difference in a refractive index between the air and the first substrate 710.

For example, if there is a difference in a refractive index between the air and the first substrate 710, the light entering the first substrate 710 through the air may be reflected due to the difference in a refractive index between the air and the first substrate 710. Therefore, the first refractive index matching layer 780 may have a refractive index between the air and the first substrate 710 to reduce the difference in a refractive index between the air and the first substrate 710. For example, if the refractive index of the air is 1 and the refractive index of the first substrate 710 is 1.6, the first refractive index matching layer 780 may have a refractive index between 1.1 and 1.5 to reduce the difference in a refractive index between the air and the first substrate 710.

The second refractive index matching layer 790 may be provided on an opposite surface of one surface of the second substrate 770, on which the second electrode 760 is provided. That is, the second electrode 760 may be provided on one surface of the second substrate 770, and the second refractive index matching layer 790 may be provided on the other surface corresponding to the opposite surface of the one surface of the second substrate 770.

Fresnel reflection may be generated due to a difference in a refractive index between the air and the second substrate 770. For example, if there is a difference in a refractive index between the air and the second substrate 770, the light entering the second substrate 770 may partially be reflected due to the difference in a refractive index between the air and the second substrate 770 when entering the air. Therefore, the second refractive index matching layer 790 may have a refractive index between the air and the second substrate 770 to reduce the difference in a refractive index between the air and the second substrate 770. For example, if the refractive index of the air is 1 and the refractive index of the second substrate 770 is 1.6, the second refractive index matching layer 790 may have a refractive index between 1.1 and 1.5 to reduce the difference in a refractive index between the air and the second substrate 770.

Each of the first and second refractive index matching layers 780 and 790 may be formed of a transparent adhesive film, such as an optically clear adhesive (OCA), an organic compound adhesive that enables thermal hardening or UV hardening, etc.

Also, if cholesteric liquid crystals 741 and dichroic dyes 742 of the guest-host liquid crystal layer 740 have properties of the positive type liquid crystals, state transition of the guest-host liquid crystal layer 740 in the transparent mode and the light shielding mode will be substantially the same as the state transition described with reference to FIGS. 3A, 3B, 4A and 4B. Also, if the cholesteric liquid crystals 741 and the dichroic dyes 742 of the guest-host liquid crystal layer 740 have properties of the negative type liquid crystals, state transition of the guest-host liquid crystal layer 740 in the transparent mode and the light shielding mode will be substantially the same as the state transition described with reference to FIGS. 7A, 7B, 8A and 8B.

Also, in FIG. 14A, the first electrode 720 includes split electrodes 721a, 721b and 721c, and the second electrode 760 is provided on the entirety of one surface of the second substrate 770. However, the first electrode 720 and the second electrode 760 are not limited to the example of FIG. 14A. That is, at least one of the first and second electrodes 720 and 760 may include split electrodes. For example, the second electrode 760 may include split electrodes as shown in FIG. 13B, and both of the first and second electrodes 720 and 760 may include split electrodes as shown in FIG. 13C. The split electrodes may be electrodes patterned in a predetermined shape.

FIG. 14B is a cross-sectional view illustrating still another detailed example of a light controlling apparatus of FIG. 1.

As shown in FIG. 14B, a light controlling apparatus 700 according to still another example embodiment of the present invention includes a first substrate 710, a first electrode 720, a first alignment film 730, a guest-host liquid crystal layer 740, a second alignment film 750, a second electrode 760, a second substrate 770, a first refractive index matching layer 780, and a second refractive index matching layer 790.

The first substrate 710, the first electrode 720, the first alignment film 730, the guest-host liquid crystal layer 740, the second alignment film 750, the second electrode 760 and the second substrate 770 of FIG. 14B are substantially the same as the first substrate 110, the first electrode 120, the first alignment film 130, the guest-host liquid crystal layer 140, the second alignment film 150, the second electrode 160, and the second substrate 170, which are described with reference to FIGS. 1 and 2. Therefore, a detailed description of the first substrate 710, the first electrode 720, the first alignment film 730, the guest-host liquid crystal layer 740, the second alignment film 750, the second electrode 760 and the second substrate 770 of FIG. 14B will be omitted.

The first refractive index matching layer 780 may be provided between the first substrate 710 and the first electrode 720 (or the first alignment film 730). Fresnel reflection may be generated due to a difference in a refractive index between the first substrate 710 and the first electrode 720. For example, if there is a difference in a refractive index between the first substrate 710 and the first electrode 720, the light that has passed through the first substrate 710 may partially be reflected due to the difference in a refractive index between the first substrate 710 and the first electrode 720 when entering the first electrode 720. Therefore, the first refractive index matching layer 780 may have a refractive index between the first substrate 710 and the first electrode 720 to reduce the difference in a refractive index between the first substrate 710 and the first electrode 720. For example, if the refractive index of the first substrate 710 is 1.6 and the refractive index of the first electrode 720 is 2, the first refractive index matching layer 780 may have a refractive index between 1.7 and 1.9 to reduce the difference in a refractive index between the first substrate 710 and the first electrode 720.

The second refractive index matching layer 790 may be provided between the second substrate 770 and the second electrode 760. Fresnel reflection may be generated due to a difference in a refractive index between the second substrate 770 and the second electrode 760. For example, if there is a difference in a refractive index between the second substrate 770 and the second electrode 760, the light that has passed through the second electrode 760 may partially be reflected due to the difference in a refractive index between the second substrate 770 and the second electrode 760 when entering the second substrate 770. Therefore, the second refractive index matching layer 790 may have a refractive index between the second substrate 770 and the second electrode 760 to reduce the difference in a refractive index between the second substrate 770 and the second electrode 760. For example, if the refractive index of the second substrate 770 is 1.6 and the refractive index of the second electrode 760 is 2, the second refractive index matching layer 790 may have a refractive index between 1.7 and 1.9 to reduce the difference in a refractive index between the second substrate 770 and the second electrode 760.

Each of the first and second refractive index matching layers 780 and 790 may be formed of a transparent adhesive film, such as an optically clear adhesive (OCA), an organic compound adhesive that enables thermal hardening or UV hardening, etc.

Also, if cholesteric liquid crystals 741 and dichroic dyes 742 of the guest-host liquid crystal layer 740 have properties of the positive type liquid crystals, state transition of the guest-host liquid crystal layer 740 in the transparent mode and the light shielding mode will be substantially the same as the state transition described with reference to FIGS. 3A, 3B, 4A and 4B. Also, if the cholesteric liquid crystals 741 and the dichroic dyes 742 of the guest-host liquid crystal layer 740 have properties of the negative type liquid crystals, state transition of the guest-host liquid crystal layer 740 in the transparent mode and the light shielding mode will be substantially the same as the state transition described with reference to FIGS. 7A, 7B, 8A and 8B.

Also, in FIG. 14B, the first electrode 720 includes split electrodes 721a, 721b and 721c, and the second electrode 760 is provided on the entirety of one surface of the second substrate 770. However, the first electrode 720 and the second electrode 760 are not limited to the example of FIG. 14B. That is, at least one of the first and second electrodes 720 and 760 may include split electrodes. For example, the second electrode 760 may include split electrodes as shown in FIG. 13B, and both of the first and second electrodes 720 and 760 may include split electrodes as shown in FIG. 13C. The split electrodes may be pattern electrodes patterned in a predetermined shape.

FIG. 14C is a cross-sectional view illustrating still another detailed example of a light controlling apparatus of FIG. 1.

As shown in FIG. 14C, a light controlling apparatus 700 according to still another example embodiment of the present invention includes a first substrate 710, a first electrode 720, a first alignment film 730, a guest-host liquid crystal layer 770, a second alignment film 750, a second electrode 760, a second substrate 770, a first refractive index matching layer 780, and a second refractive index matching layer 790.

The first substrate 710, the first electrode 720, the first alignment film 730, the guest-host liquid crystal layer 740, the second alignment film 750, the second electrode 760 and the second substrate 770 of FIG. 13C are substantially the same as the first substrate 110, the first electrode 120, the first alignment film 130, the guest-host liquid crystal layer 140, the second alignment film 150, the second electrode 160, and the second substrate 170, which are described with reference to FIGS. 1 and 2. Therefore, a detailed description of the first substrate 710, the first electrode 720, the first alignment film 730, the guest-host liquid crystal layer 740, the second alignment film 750, the second electrode 760 and the second substrate 770 of FIG. 14C will be omitted.

The first refractive index matching layer 780 may be provided between the first alignment film 730 and the guest-host liquid crystal layer 740. Fresnel reflection may be generated due to a difference in a refractive index between the first alignment film 730 and the guest-host liquid crystal layer 740. For example, if there is a difference in a refractive index between the first alignment film 730 and the guest-host liquid crystal layer 740, the light that has passed through the first alignment film 730 may partially be reflected due to the difference in a refractive index between the first alignment film 730 and the guest-host liquid crystal layer 740 when entering the liquid crystal layer 740. Therefore, the first refractive index matching layer 780 may have a refractive index between the first alignment film 730 and the guest-host liquid crystal layer 740 to reduce the difference in a refractive index between the first alignment film 730 and the guest-host liquid crystal layer 740.

The second refractive index matching layer 790 may be provided between the second alignment film 750 and the guest-host liquid crystal layer 740. Fresnel reflection may be generated due to a difference in a refractive index between the second alignment film 750 and the guest-host liquid crystal layer 740. For example, if there is a difference in a refractive index between the second alignment film 750 and the guest-host liquid crystal layer 740, the light that has passed through the second alignment film 750 may partially be reflected due to the difference in a refractive index between the second alignment film 750 and the guest-host liquid crystal layer 740 when entering the guest-host liquid crystal layer 740. Therefore, the second refractive index matching layer 790 may have a refractive index between the second alignment film 750 and the guest-host liquid crystal layer 740 to reduce the difference in a refractive index between the second alignment film 750 and the guest-host liquid crystal layer 740.

Each of the first and second refractive index matching layers 780 and 790 may be formed of a transparent adhesive film, such as an optically clear adhesive (OCA), an organic compound adhesive that enables thermal hardening or UV hardening, etc. The difference in a refractive index may be reduced by the first refractive index matching layer 780 or the second refractive index matching layer 790, thereby improving the transmittance ratio.

Also, if cholesteric liquid crystals 741 and dichroic dyes 742 of the guest-host liquid crystal layer 740 have properties of the positive type liquid crystals, state transition of the guest-host liquid crystal layer 740 in the transparent mode and the light shielding mode will be substantially the same as the state transition described with reference to FIGS. 3A, 3B, 4A and 4B. Also, if the cholesteric liquid crystals 741 and the dichroic dyes 742 of the guest-host liquid crystal layer 740 have properties of the negative type liquid crystals, state transition of the guest-host liquid crystal layer 740 in the transparent mode and the light shielding mode will be substantially the same as the state transition described with reference to FIGS. 7A, 7B, 8A and 8B.

Also, in FIG. 14C, the first electrode 720 includes split electrodes 721a, 721b and 721c, and the second electrode 760 is provided on the entirety of one surface of the second substrate 770. However, the first electrode 720 and the second electrode 760 are not limited to the example of FIG. 14C. That is, at least one of the first and second electrodes 720 and 760 may include split electrodes. For example, the second electrode 760 may include split electrodes as shown in FIG. 13B, and both of the first and second electrodes 720 and 760 may include split electrodes as shown in FIG. 13C. The split electrodes may be electrodes patterned in a predetermined shape.

Figure 15:
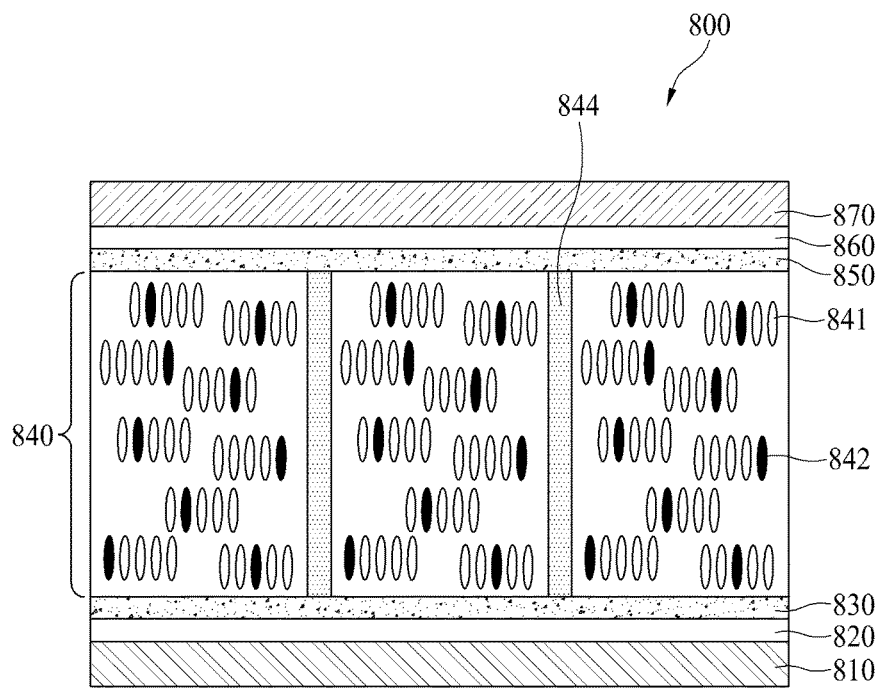
FIG. 15 is a cross-sectional view illustrating still another detailed example of a light controlling apparatus of FIG. 1.

FIG. 15 is a cross-sectional view illustrating still another detailed example of a light controlling apparatus of FIG. 1.

As shown in FIG. 15, the light controlling apparatus 800 according to still another example embodiment of the present invention includes a first substrate 810, a first electrode 820, a first alignment film 830, a guest-host liquid crystal layer 840, a second alignment film 850, a second electrode 860, and a second substrate 870.

The first substrate 810, the first alignment film 830, the second alignment film 850 and the second substrate 870 of FIG. 15 are substantially the same as the first substrate 110, the first alignment film 130, the second alignment film 150 and the second substrate 170, which are described with reference to FIGS. 1 and 2. Therefore, a detailed description of the first substrate 810, the first alignment film 830, the second alignment film 850 and the second substrate 870 of FIG. 15 will be omitted.

The first electrode 820 is provided on the first substrate 810, and the second electrode 860 is provided on the second substrate 870. The first electrode 820 may be provided on the entirety of one surface of the first substrate 810, and the second electrode 870 may also be provided on the entirety of one surface of the second substrate 870.

Each of the first and second electrodes 820 and 860 may be a transparent electrode. For example, each of the first and second electrodes 820 and 860 may be formed of a transparent conductive material that has conductivity and at the same time may transmit external light. For example, each of the first and second electrodes 820 and 860 may be, but is not limited to, silver oxide (e.g., AgO or $Ag_2O$ or $Ag_2O_3$), aluminum oxide (e.g., $Al_2O_3$), tungsten oxide (e.g., $WO_2$ or $WO_3$ or $W_2O_3$), magnesium oxide (e.g., MgO), molybdenum oxide (e.g., $MoO_3$), zinc oxide (e.g., ZnO), tin oxide (e.g., $SnO_2$), indium oxide (e.g., $In_2O_3$), chrome oxide (e.g., $CrO_3$ or $Cr_2O_3$), antimony oxide (e.g., $Sb_2O_3$ or $Sb_2O_5$), titanium oxide (e.g., $TiO_2$), nickel oxide (e.g., NiO), copper oxide (e.g., CuO or $Cu_2O$), vanadium oxide (e.g., $V_2O_3$ or $V_2O_5$), cobalt oxide (e.g., CoO), iron oxide (e.g., $Fe_2O_3$ or $Fe_3O_4$), niobium oxide (e.g., $Nb_2O_5$), indium tin oxide (ITO), indium zinc oxide (IZO), aluminum doped zinc oxide (ZAO), aluminum tin oxide (TAO) or antimony tin oxide (ATO). The first electrode 820 may be comprised by forming a material for forming the first electrode 820 on the entirety of one surface of the first substrate 810. Alternatively, the first electrode 820 may be comprised by forming a material for forming the first electrode 820 on the entirety of one surface of the first substrate 810 and then patterning the material. The second electrode 860 may be comprised by forming a material for forming the second electrode 860 on the entirety of one surface of the second substrate 870. Alternatively, the second electrode 860 may be comprised by forming a material for forming the second electrode 860 on the entirety of one surface of the second substrate 870 and then patterning the material.

The light controlling apparatus 800 may further include a voltage supply unit for supplying a predetermined voltage to each of the first and second electrodes 820 and 860. In the example embodiment of the present invention, the guest-host liquid crystal layer 840 is state-transited in accordance with the voltages applied to the first and second electrodes 820 and 860, whereby the light shielding mode for shielding the incident light and the transparent mode for transmitting the incident light may be realized.

The guest-host liquid crystal layer 840 is provided between the first alignment film 830 and the second alignment film 850. Cholesteric liquid crystals 843 of the guest-host liquid crystal layer 840 may be formed by adding a chiral dopant or photo-sensitive chiral dopant, which derives a helical structure, to nematic liquid crystals. Alternatively, the cholesteric liquid crystals 843 of the guest-host liquid crystal layer 840 may be formed by further adding an additive, such as photoinitiator, to the nematic liquid crystals and the chiral dopant or photo-sensitive chiral dopant. The cholesteric liquid crystals 843 of the guest-host liquid crystal layer 840 may be subjected to state transition to a planar state, a focal conic state, and a homeotropic state. In the example embodiment of the present invention, the cholesteric liquid crystals of the guest-host liquid crystal layer 840 are controlled at the homeotropic state in the transparent mode and controlled at the focal conic state in the light shielding mode.

The guest-host liquid crystal layer 840 may include cholesteric liquid crystals 841, dichroic dyes 842, and spacers 844. The cholesteric liquid crystals 841 may be nematic liquid crystals. The cholesteric liquid crystals 841 may be dual frequency liquid crystals arranged in a vertical direction (y-axis direction) in accordance with the frequency of the voltages applied to the first and second electrodes 820 and 860.

The dichroic dyes 842 may be the dyes that absorb light. For example, the dichroic dyes 842 may be black dyes that absorb every light of a visible ray wavelength range or dyes that absorb light except a specific colored (for example, red) wavelength and reflect light of the specific colored (for example, red) wavelength. The dichroic dyes 842 may be, but are not limited to, black dyes to increase light shielding efficiency like the example embodiment of the present invention.

Alternatively, the dichroic dyes 842 may be formed of dyes having a color, and may have any one color among a black, a red, a green, a blue, and a yellow, or their mixture color. For example, if the light controlling apparatus 800 is coupled to a rear surface of a transparent display panel, light from the rear surface should be shielded to improve visibility of an image while the image is being displayed. In this case, the dichroic dyes 842 may be made of black dyes. In addition, a color of the dichroic dyes 842 may be selectively changed depending on a place where the light controlling apparatus 800 is used and a purpose of use of the light controlling apparatus 800, whereby esthetic effect may be provided to a user.

Also, if the cholesteric liquid crystals 841 are dual frequency liquid crystals, the dichroic dyes 842 have properties of the dual frequency liquid crystals. Therefore, the dichroic dyes 842 may also be arranged in a vertical direction (y-axis direction) in accordance with the frequency of the voltages applied to the first and second electrodes 820 and 860.

If the guest-hosts liquid crystal layer 841 has the focal conic state as shown in FIGS. 4A and 4B, the cholesteric liquid crystals 841 and the dichroic dyes 842 may be rotated helically by the chiral dopant.

If the frequency of the voltages applied to the first and second electrodes 820 and 860 correspond to the first frequency, the cholesteric liquid crystals of the guest-hosts liquid crystal layer 840 may be controlled at the homeotropic state, whereby the transparent mode may be realized. Also, if the frequency of the voltages applied to the first and second electrodes 820 and 860 correspond to the second frequency, the cholesteric liquid crystals of the guest-hosts liquid crystal layer 840 may be controlled at the focal conic state, whereby the light shielding mode may be realized.

[Transparent Display Device]

Figure 16:
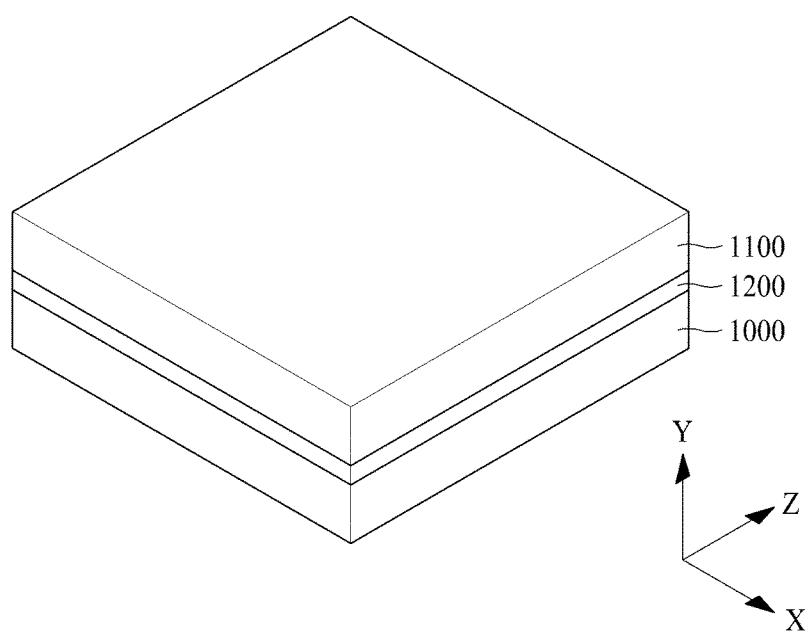
FIG. 16 is a perspective view illustrating a transparent display device according to one embodiment of the present invention.

FIG. 16 is a perspective view illustrating a transparent display device according to an example embodiment of the present invention.

As shown in FIG. 16, the transparent display device includes a light controlling apparatus 1000, a transparent display panel 1100, and an adhesive layer 1200.

The light controlling apparatus 1000 may be realized as any one of the light controlling apparatuses 100, 200, 300, 400, 500, 600, 700 and 700 according to the example embodiments of the present invention described with reference to FIGS. 1, 2, 9, 10, 11A to 11C, 12, 14A to 14C and 15 or other embodiments. Therefore, the light controlling apparatus 1000 may shield the incident light in the light shielding mode and transmit the incident light in the transparent mode. The light controlling apparatus 1000 may allow its rear background not to be displayed by displaying a specific color in accordance with dichroic dyes, whereby the light controlling apparatus 1000 may be realized to provide a user with esthetic effect in addition to a light shielding function.

Figure 17A:
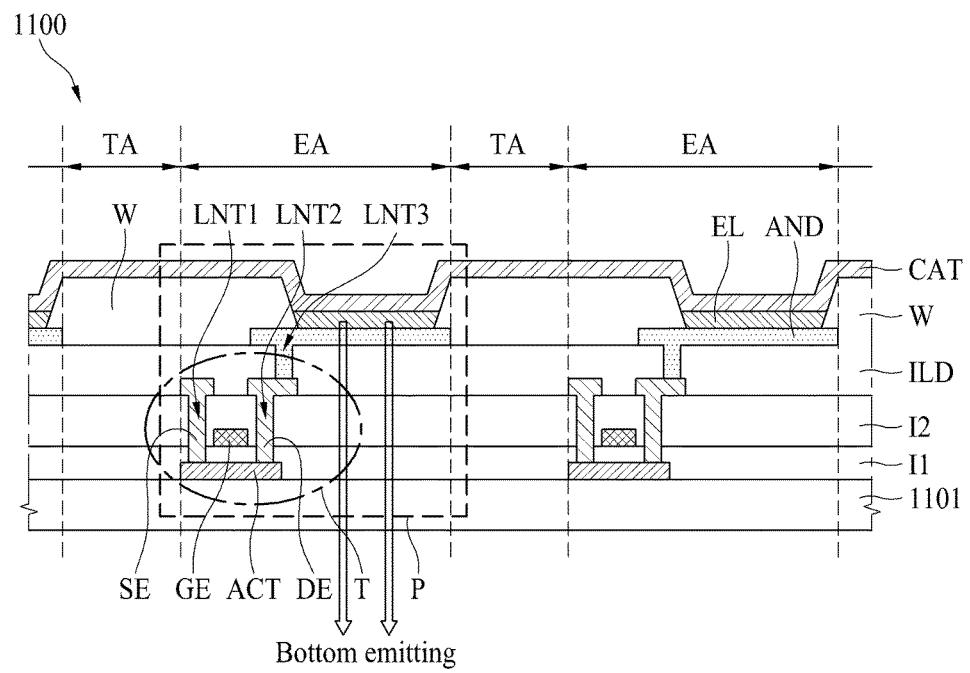
FIG. 17A is a cross-sectional view illustrating a detailed example of a lower substrate of a transparent display panel of FIG. 16.
Figure 17B:
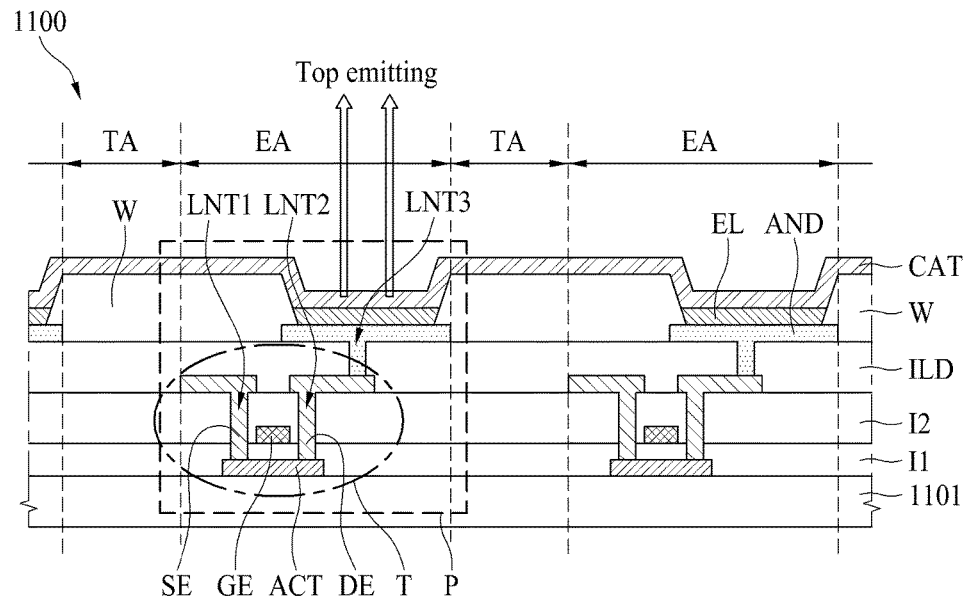
FIG. 17B is a cross-sectional view illustrating another detailed example of a lower substrate of a transparent display panel of FIG. 16.

FIG. 17A is a cross-sectional view illustrating a detailed example of a lower substrate of a transparent display panel of FIG. 16. FIG. 17B is a cross-sectional view illustrating another detailed example of a lower substrate of a transparent display panel of FIG. 16.

As shown in FIGS. 17A and 17B, the transparent display panel 1100 includes a transmissive area TA and an emissive area EA in one sub pixel area. The emissive area EA indicates an area where an actual image is displayed, and the transmissive area TA indicates an area where external light is transmitted to the transparent display panel. Therefore, if the transparent display panel 1100 is not driven, the user may watch a background of the transparent display panel 1100, that is, either an object of a rear side or a background of the transparent display panel 1100. Alternatively, if the transparent display panel 1100 is driven, the user may simultaneously watch the actual image of the emissive area EA and a background through the transmissive area TA. An area ratio of the emissive area EA and the transmissive area TA in the sub pixel area may be set variously in view of visibility and a transmittance ratio.

Pixels P displaying an image are provided in the emissive area EA. Each of the pixels P may be provided with a transistor device T, an anode electrode AND, an organic layer EL, and a cathode electrode CAT as shown in FIGS. 17A and 17B.

The transistor device T includes an active layer ACT provided on a lower substrate 1101, a first insulating film I1 provided on the active layer ACT, a gate electrode GE provided on the first insulating film I1, a second insulating film I2 provided on the gate electrode GE, and source and drain electrodes SE and DE provided on the second insulating film I2 and connected to the active layer ACT through first and second contact holes CNT1 and CNT2. Although the transistor device T is formed in a top gate type in FIGS. 17A and 17B, the transistor device T may be formed in a bottom gate type without limitation to the top gate type.

The anode electrode AND is connected to the drain electrode DE of the transistor device T through a third contact hole CNT3 that passes through an inter layer dielectric ILD provided on the source and drain electrodes SE and DE. A barrier is provided between the anode electrodes AND adjacent to each other, whereby the anode electrodes AND adjacent to each other may be insulated electrically.

The organic layer EL is provided on the anode electrode AND. The organic layer El may include a hole transporting layer, an organic light emitting layer, and an electrode transporting layer.

The cathode electrode CAT is provided on the organic layer EL and the barrier W. If a voltage is applied to the anode electrode AND and the cathode electrode CAT, holes and electrons are moved to an organic light emitting layer through the hole transporting layer and the electron transporting layer and combined with each other in the organic light emitting layer to emit light.

The transparent display panel 1100 is formed in a bottom emission type in FIG. 17A. If the transparent display panel 1100 is formed in a bottom emission type, light is emitted toward the lower substrate 1101. Therefore, the light controlling apparatus 1000 may be arranged on an upper substrate.

In the bottom emission type, because light of the organic layer EL is emitted toward the lower substrate 1101, the transistor T may be provided below the barrier W to reduce luminance reduction caused by the transistor T. Also, in the bottom emission type, the anode electrode AND may be formed of a transparent metal material, such as ITO and IZO, and the cathode electrode CAT may be formed of a metal material having high reflectivity, such as aluminum or a structure having aluminum and ITO. To improve the transmittance ratio in the transparent mode, the cathode electrode CAT may be formed by patterning in the emissive area EA only.

The transparent display panel 1100 is formed in a top emission type in FIG. 17B. If the transparent display panel 1100 is formed in a top emission type, light is emitted toward the upper substrate. Therefore, the light controlling apparatus 1000 may be arranged below the lower substrate 1101.

In the top emission type, because light of the organic layer EL is emitted toward the upper substrate, the transistor T may be provided in a wide range below the barrier W and the anode electrode AND. Therefore, the top emission type has advantages in that a design area of the transistor T is wider than that of the bottom emission type and an aperture ratio may be improved. Also, in the top emission type, the anode electrode AND may be formed of a metal material having high reflectivity, such as aluminum or a structure having aluminum and ITO, and the cathode electrode CAT may be formed of a transparent metal material, such as ITO and IZO.

The transparent display panel according to the example embodiment of the present invention may be realized in a dual emission type. If the transparent display panel 1100 is realized in a dual emission type, light is emitted toward the upper substrate and the lower substrate.

The adhesive layer 1200 bonds the light controlling apparatus 1000 and the transparent display panel 1100 to each other. The adhesive layer 1200 may be a transparent adhesive film, such as an optically clear adhesive (OCA), or a transparent adhesive, such as an optically clear resin (OCR).

If the light controlling apparatus 1000 is attached to a light emission direction of the transparent display panel 1100, the emissive area EA of the transparent display panel 1100 should not be shielded, whereas the transmissive area TA of the transparent display panel 1100 should be shielded. Therefore, the light controlling apparatus 1000 may form a light shielding area by patterning to shield the transmissive area TA only of the transparent display panel 1100. In this case, the light shielding area should be aligned in the transmissive area TA of the transparent display panel 1100. As described above, if the light controlling apparatus 1000 is attached to the light emission direction of the transparent display panel 1100, the light shielding area of the light controlling apparatus 1000 should be patterned and should be aligned in the transmissive area of the transparent display panel 1100, whereby the light controlling apparatus 1000 may be attached to an opposite direction of the light emission direction of the transparent display panel 1100. For example, in the case of the top emission type as shown in FIG. 17B, one surface of the adhesive layer 1200 may be bonded to a surface below the lower substrate 1101 of the transparent display panel 1100, and the other surface of the adhesive layer 1200 may be bonded to the light controlling apparatus 1000. In the case of the bottom emission type as shown in FIG. 17A, one surface of the adhesive layer 120 may be bonded onto the upper substrate, and the other surface of the adhesive layer 1200 may be bonded to the light controlling apparatus 1000. If the adhesive layer 1200 includes a transparent adhesive film, such as OCA, or a transparent adhesive, such as OCR, the adhesive layer 1200 may have a refractive index between 1.4 and 1.9.

Also, the transparent display device may use dichroic dyes having an excellent dichroic ratio (DR) to realize a true black. The DR represents a long axis light absorption ratio of the dichroic dyes to a short axis light absorption ratio. Because the dichroic dyes are arranged in a vertical direction (y-axis direction) in a transparent mode as shown in FIG. 7B and arranged to be helically rotated by a chiral dopant in a light shielding mode as shown in FIG. 7A, the short axis light absorption ratio of the dichroic dyes may be a light absorption ratio of the dichroic dyes in the transparent mode, and the long axis light absorption ratio of the dichroic dyes may be a light absorption ratio of the dichroic dyes in the light shielding mode. To realize the transparent display device of a true black, it may be efficient that the dichroic dyes of which DR is more than 7 are used.

Also, the lower substrate 1101 or the upper substrate of the transparent display panel 1100 may be a second substrate of the light controlling apparatus 1000. In this case, the second electrode 160 of the light controlling apparatus 1000 may be provided on the lower substrate 1101 or the upper substrate of the transparent display panel 1100.

The transparent display panel 1100 may be realized in a display mode in which pixels display an image and a non-display mode in which pixels do not display an image. If the transparent display panel 1100 is realized in a display mode in which pixels display an image, the light controlling apparatus 1000 may be realized in a light shielding mode for shielding the light incident through a rear surface of the transparent display panel 1100 to increase quality of the image.

In the non-display mode in which pixels do not display an image, the light controlling apparatus 1000 may be realized in a light shielding mode or a transparent mode. In the non-display mode in which pixels do not display an image, if the light controlling apparatus 1000 is realized in a light shielding mode, the transparent display device is seen to a user as a black color. In the non-display mode in which pixels do not display an image, if the light controlling apparatus 1000 is realized in a transparent mode, the transparent display device is realized transparently, whereby the user may see a rear background of the transparent display device through the transparent display device.

Figure 18:
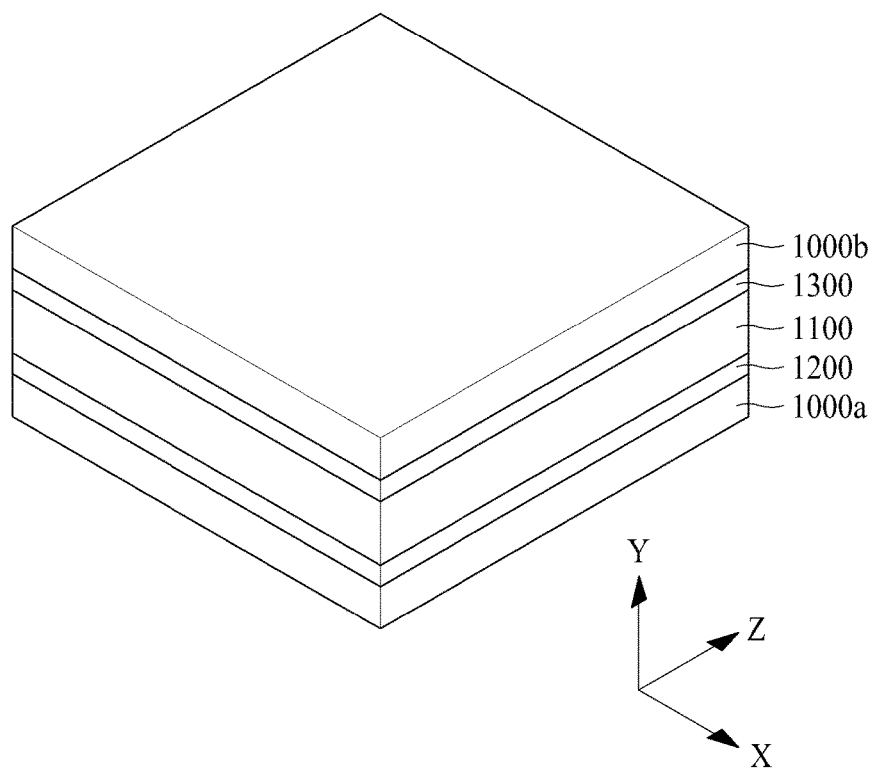
FIG. 18 is a perspective view illustrating a transparent display device according to another embodiment of the present invention.

FIG. 18 is a perspective view illustrating a transparent display device according to another example embodiment of the present invention.

As shown in FIG. 18, the transparent display device includes a light controlling apparatus 1000*a*, a second light controlling apparatus 1000*b*, a transparent display panel 1100, a first adhesive layer 1200, and a second adhesive layer 1300.

Each of the first and second light controlling apparatuses 1000*a* and 1000*b* may be realized as any one of the light controlling apparatuses 100, 200, 300, 400, 500, 600, 700 and 800 according to the embodiments of the present invention described with reference to FIGS. 1, 2, 9, 10, 11A to 11C, 12, 14A to 14C and 15. Therefore, each of the first and second light controlling apparatuses 1000*a* and 1000*b* may shield the incident light in the light shielding mode and transmit the incident light in the transparent mode. Each of the first and second light controlling apparatuses 1000*a* and 1000*b* may be realized to provide a user with esthetic effect in addition to a light shielding function in accordance with dichroic dyes.

The transparent display panel 1100 is substantially the same as that described with reference to FIGS. 16 and 17. Therefore, a detailed description of the transparent display panel 1100 of FIG. 18 will be omitted.

The first adhesive layer 1200 bonds the first light controlling apparatus 1000*a* and the transparent display panel 1100 to each other. The first adhesive layer 1200 may be a transparent adhesive film, such as an optically clear adhesive (OCA). One surface of the first adhesive layer 1200 may be bonded to a surface below a lower substrate 1101 of the transparent display panel 1100 or bonded onto an upper substrate, and the other surface of the first adhesive layer 1200 may be bonded to the first light controlling apparatus 1000*a*. If the first adhesive layer 1200 is realized as a transparent adhesive film, such as OCA, the first adhesive layer 1200 may have a refractive index between 1.4 and 1.9.

The second adhesive layer 1300 bonds the second light controlling apparatus 1000*b* and the transparent display panel 1100 to each other. The second adhesive layer 1300 may be a transparent adhesive film, such as an optically clear adhesive (OCA). One surface of the second adhesive layer 1300 may be bonded to a surface below the lower substrate 1101 of the transparent display panel 1100 or bonded onto the upper substrate, and the other surface of the second adhesive layer 1300 may be bonded to the second light controlling apparatus 1000*b*. If the second adhesive layer 1300 is realized as a transparent adhesive film, such as OCA, the second adhesive layer 1300 may have a refractive index between 1.4 and 1.9.

The transparent display panel 1100 may be realized in a display mode in which pixels display an image and a non-display mode in which pixels do not display an image. It is assumed that a user views an image through the second light controlling apparatus 1000*b*. In this case, if the transparent display panel 1100 is realized in a display mode in which pixels display an image, the first light controlling apparatus 1000*a* may be realized in a light shielding mode for shielding the light incident through a rear surface of the transparent display panel 1100 to increase quality of the image, and the second light controlling apparatus 1000*b* may be realized in a transparent mode.

In the non-display mode in which pixels do not display an image, the first and second light controlling apparatuses 1000*a* and 1000*b* may be realized in a light shielding mode or a transparent mode. In the non-display mode in which pixels do not display an image, if the first and second light controlling apparatuses 1000*a* and 1000*b* are realized in a light shielding mode, the transparent display device is seen to a user as a black color. In the non-display mode in which pixels do not display an image, if the first and second light controlling apparatuses 1000*a* and 1000*b* are realized in a transparent mode, the transparent display device is realized transparently, whereby the user may see a rear background of the transparent display device through the transparent display device.

Meanwhile, the transparent display panel 1100 may be provided as a dual transparent display panel that may display an image in dual directions. In a display mode in which the dual transparent display panel displays an image in dual directions, if the first and second light controlling apparatuses 1000*a* and 1000*b* are realized in a transparent mode, users may view the image in dual directions. Also, in a display mode in which the dual transparent display panel displays an image in dual directions, if any one of the first and second light controlling apparatuses 1000*a* and 1000*b* is realized in a light shielding mode, the corresponding light controlling apparatus may prevent the user from viewing the image in any one direction of the dual directions.

As described above, according to embodiments of the present invention, a number of advantages may be obtained.

For example, the cholesteric liquid crystals of the guest-host liquid crystal layer may be controlled at the homeotropic state to transmit the incident light, thereby increasing light transmittance in the transparent mode.

Further, the cholesteric liquid crystals of the guest-host liquid crystal layer may be controlled at the focal conic state to scatter the incident light, thereby increasing the light shielding ratio in the light shielding mode.

Also, the homeotropic state may be maintained due to the alignment film even though no voltage is applied any more when state transition to the homeotropic state is generated. Likewise, the focal conic state may be maintained due to the alignment film even though no voltage is applied any more when state transition to the focal conic state is generated. That is, because two stable states of the homeotropic state and the focal conic state may stably be maintained even though no voltage is applied any more after state transition, power consumption may be reduced.

Moreover, because the transparent mode may be realized at the initial state due to the alignment film or the alignment material included in the liquid crystal layer, power consumption may be reduced.

In addition, the pitch of the cholesteric liquid crystals is designed to reflect the light of the infrared wavelength range (780 nm or more) or the ultraviolet wavelength range (380 nm or less) not the visible ray wavelength range. Therefore, because the cholesteric liquid crystals do not reflect the light of the visible ray wavelength range, the problem occurring as some of visible rays is reflected and then viewed by a user may be solved.

Also, the cholesteric liquid crystals that reflect the light of the infrared wavelength range or the ultraviolet wavelength range are used, whereby the transmittance ratio may not be deteriorated in the transparent mode and the light shielding ratio may be increased in the light shielding mode.

Further, because the rear background of the light controlling apparatus may not be displayed by display of a specific color in accordance with the dichroic dyes in the guest-hosts liquid crystal layer, the light shielding ratio may be improved.

Because the incident light may be more scattered by the polymer networks included in the guest-host liquid crystal layer, the incident light may be absorbed by the dichroic dyes, thereby improving the light shielding ratio.

Moreover, the spacers for maintaining a cell gap of the guest-host liquid crystal layer are provided to protect the inside of the guest-host liquid crystal layer and prevent the first electrode and the second electrode from being shorted when an external force is applied to the guest-host liquid crystal layer. Also, the spacers may serve as barriers that partition the guest-host liquid crystal layer, whereby the same amount of the cholesteric liquid crystals and dichroic dyes may be formed in each of the partitioned spaces, or the pitch of the cholesteric liquid crystals may be controlled differently in each of partitioned spaces to form the cholesteric liquid crystals of which pitches are different from one another.

Also, as the pitch P of the cholesteric liquid crystals may be controlled differently, the incident light may be scattered and the rear background of the light controlling apparatus may not be displayed, whereby the light shielding ratio may be improved.

In addition, because the light controlling apparatus includes the refractive index matching layers, the difference in a refractive index between the substrate and the air, between the substrate and the electrode or between the alignment film and the liquid crystal layer may be reduced, thereby improving the transmittance ratio.

The light controlling apparatus may be applied to the transparent display device. For example, in the display mode in which pixels of the transparent display panel display an image, if the light controlling apparatus is realized in the light shielding mode for shielding the light incident upon the rear surface of the transparent display panel, quality of the image displayed by the transparent display panel may be increased. Also, in the non-display mode in which pixels of the transparent display panel do not display an image, if the light controlling apparatus is realized in the transparent mode, the transparent display device is realized transparently, whereby the user may see the rear background of the transparent display device through the transparent display device.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A light controlling apparatus, comprising:
a first electrode on a first substrate;
a first alignment film on the first electrode;
a second electrode on a second substrate facing the first substrate;
a second alignment film on the second electrode; and
a guest-host liquid crystal layer between the first alignment film and the second alignment film, the guest-host liquid crystal layer including cholesteric liquid crystals and dichroic dyes,
wherein the first and second electrodes provide a vertical electric field,
at least one of the first and second electrodes provides a horizontal electric field,
the cholesteric liquid crystals have a homeotropic state when an electric field in a first direction is applied to the guest-host liquid crystal layer, whereby a transparent mode transmitting incident light is realized,
the cholesteric liquid crystals have a focal conic state when an electric field in a second direction is applied to the guest-host liquid crystal layer, whereby a light shielding mode shielding incident light is realized, and
the cholesteric liquid crystals and the dichroic dyes maintain the same state when no electric field is applied to the guest-host liquid crystal layer.

2. The light controlling apparatus of claim 1, wherein the first direction is a vertical direction, and the second direction is a horizontal direction.

3. The light controlling apparatus of claim 1, wherein the first direction is a horizontal direction, and the second direction is a vertical direction.

4. The light controlling apparatus of claim 1, wherein the cholesteric liquid crystals and the dichroic dyes are arranged in a vertical direction in the transparent mode.

5. The light controlling apparatus of claim 1, wherein the cholesteric liquid crystals and the dichroic dyes are arranged randomly in the light shielding mode.

6. The light controlling apparatus of claim 1, wherein the cholesteric liquid crystals reflect light of an infrared wavelength range or an ultraviolet wavelength range.

7. The light controlling apparatus of claim 1, wherein the first electrode includes split electrodes to provide the horizontal electric field.

8. The light controlling apparatus of claim 7, wherein if the cholesteric liquid crystals are positive type liquid crystals, the cholesteric liquid crystals are transited from the homeotropic state to the focal conic state by the horizontal electric field, and are transited from the focal conic state to the homeotropic state by the vertical electric field.

9. The light controlling apparatus of claim 7, wherein if the cholesteric liquid crystals are negative type liquid crystals, the cholesteric liquid crystals are transited from the homeotropic state to the focal conic state by the vertical electric field, and are transited from the focal conic state to the homeotropic state by the horizontal electric field.

10. The light controlling apparatus of claim 1, wherein the second electrode includes split electrodes for providing the horizontal electric field.

11. The light controlling apparatus of claim 10, wherein if the cholesteric liquid crystals are positive type liquid crystals, the cholesteric liquid crystals are transited from the homeotropic state to the focal conic state by the horizontal electric field, and are transited from the focal conic state to the homeotropic state by the vertical electric field.

12. The light controlling apparatus of claim 10, wherein if the cholesteric liquid crystals are negative type liquid crystals, the cholesteric liquid crystals are transited from the homeotropic state to the focal conic state by the vertical electric field, and are transited from the focal conic state to the homeotropic state by the horizontal electric field.

13. The light controlling apparatus of claim 1, wherein the first and second electrodes include split electrodes for providing the horizontal electric field.

14. The light controlling apparatus of claim 13, wherein if the cholesteric liquid crystals are positive type liquid crystals, the cholesteric liquid crystals are transited from the homeotropic state to the focal conic state by the horizontal electric field, and are transited from the focal conic state to the homeotropic state by the vertical electric field.

15. The light controlling apparatus of claim 13, wherein, if the cholesteric liquid crystals are negative type liquid crystals, the cholesteric liquid crystals are transited from the homeotropic state to the focal conic state by the vertical electric field, and are transited from the focal conic state to the homeotropic state by the horizontal electric field.

16. The light controlling apparatus of claim 1, wherein the first and second alignment films arrange the cholesteric liquid crystals and the dichroic dyes in a vertical direction.

17. The light controlling apparatus of claim 1, wherein the guest-host liquid crystal layer further includes polymer networks.

18. The light controlling apparatus of claim 1, wherein the guest-host liquid crystal layer further includes spacers for maintaining a cell gap of the guest-host liquid crystal layer.

19. A light controlling apparatus, comprising:
a first electrode on a first substrate;
a second electrode on a second substrate facing the first substrate; and
a guest-host liquid crystal layer between the first electrode and the second electrode, the guest-host liquid crystal layer including cholesteric liquid crystals, dichroic dyes and a vertical alignment material arranging the cholesteric liquid crystals and the dichroic dyes in a vertical direction,
wherein the first and second electrodes provide a vertical electric field,
at least one of the first and second electrodes provides a horizontal electric field,
the cholesteric liquid crystals have a homeotropic state when an electric field in a first direction is applied to the guest-host liquid crystal layer, whereby a transparent mode transmitting incident light is realized,
the cholesteric liquid crystals have a focal conic state when an electric field in a second direction is applied to the guest-host liquid crystal layer, whereby a light shielding mode shielding incident light is realized, and
the cholesteric liquid crystals maintain the same state when no electric field is applied to the guest-host liquid crystal layer.

20. A transparent display device, comprising:
a transparent display panel including a transmissive area and an emissive area, the emissive displaying an image; and
a light controlling apparatus on at least one surface of the transparent display panel,
wherein the light controlling apparatus includes a guest-host liquid crystal layer between a first alignment film and a second alignment film, the guest-host liquid crystal layer including cholesteric liquid crystals and dichroic dyes, and the cholesteric liquid crystals have a focal conic state in a display mode for displaying the image in the emissive area, whereby the light controlling apparatus is realized in a light shielding mode shielding incident light.

21. The transparent display device of claim 20, wherein the cholesteric liquid crystals have a homeotropic state in a non-display mode in which the image is not displayed in the emissive area, whereby the light controlling apparatus is realized in a transparent mode transmitting incident light.

22. The transparent display device of claim 20, wherein the cholesteric liquid crystals have the focal conic state in a non-display mode in which the image is not displayed in the emissive area, whereby the light controlling apparatus is realized in a transparent mode transmitting incident light.

23. The transparent display device of claim 20, wherein the light controlling apparatus further includes first and second electrodes, the first and second electrodes provide a vertical electric field,
at least one of the first and second electrodes provides a horizontal electric field,
the cholesteric liquid crystals have a homeotropic state when an electric field in a first direction is applied to the guest-host liquid crystal layer, whereby a transparent mode transmitting incident light is realized,
the cholesteric liquid crystals have the focal conic state when an electric field in a second direction is applied to the guest-host liquid crystal layer, whereby a light shielding mode shielding incident light is realized, and
the cholesteric liquid crystals maintain the same state when no electric field is applied to the guest-host liquid crystal layer.

24. A light controlling apparatus, comprising:
a first electrode on a first substrate;
a first alignment film on the first electrode;
a second electrode on a second substrate facing the first substrate;
a second alignment film on the second electrode;
a third electrode between the first substrate and the first electrode;
a guest-host liquid crystal layer between the first alignment film and the second alignment film, including cholesteric liquid crystals and dichroic dyes, wherein the first and second electrodes provide a vertical electric field, the first and third electrodes provide a horizontal electric field, the cholesteric liquid crystals have a homeotropic state when an electric field in a first direction is applied to the guest-host liquid crystal layer, whereby a transparent mode transmitting incident light is realized, the cholesteric liquid crystals have a focal conic state when an electric field in a second direction is applied to the guest-host liquid crystal layer, whereby a light shielding mode shielding incident light is realized, and the cholesteric liquid crystals maintain the same state when no electric field is applied to the guest-host liquid crystal layer.

* * * * *